US008464118B2

(12) United States Patent
Nikkila et al.

(10) Patent No.: US 8,464,118 B2
(45) Date of Patent: Jun. 11, 2013

(54) METHOD AND SYSTEM FOR WIRELESS REAL-TIME TRANSMISSION OF MULTICHANNEL AUDIO OR VIDEO DATA

(75) Inventors: Seppo Nikkila, Helsinki (FI); Tom Lindeman, Helsinki (FI)

(73) Assignee: ANT—Advanced Network Technology Oy, Helskinki (FI)

( * ) Notice: Subject to any disclaimer, the term of this patent is extended or adjusted under 35 U.S.C. 154(b) by 1044 days.

(21) Appl. No.: 12/299,287

(22) PCT Filed: Apr. 26, 2007

(86) PCT No.: PCT/FI2007/050234
§ 371 (c)(1),
(2), (4) Date: Feb. 5, 2009

(87) PCT Pub. No.: WO2007/125175
PCT Pub. Date: Nov. 8, 2007

(65) Prior Publication Data
US 2009/0240998 A1    Sep. 24, 2009

Related U.S. Application Data

(60) Provisional application No. 60/814,883, filed on Jun. 20, 2006.

(30) Foreign Application Priority Data

May 2, 2006    (FI) .................................... 20060421

(51) Int. Cl.
*G06F 11/00*    (2006.01)
(52) U.S. Cl.
USPC ........................................................ 714/746
(58) Field of Classification Search
None
See application file for complete search history.

(56) References Cited

U.S. PATENT DOCUMENTS 6,791,996 B1 * 9/2004 Watanabe et al. ............. 370/447
6,934,752 B1 * 8/2005 Gubbi ........................... 709/225
(Continued)

FOREIGN PATENT DOCUMENTS

EP        0924896 A1    6/1999
WO    WO-0076272 A1    12/2000
(Continued)

OTHER PUBLICATIONS

ANSI/IEEE Std 802.11, Part 11:Wireless LAN Medium Access Control (MAC) and Physical Layer (PHY) Specifications, 1999 Edition (R2003), pp. 70-97, URL:http://ieeexplore.ieee.org/iel5/9543/30234/01389197.pdf?tp=&arnumber=1389197&isnumber=30234.
V. Kravcenko et al., "Multicast Audio over Wireless LAN for Professional.Applications" Publications, Germany,DSPECWLISTS Digitale Audiound i/lesssysteme GmbH, Feb. 2005, pp. 1-8.

(Continued)

*Primary Examiner* — Michael Maskulinski
(74) *Attorney, Agent, or Firm* — Muncy, Geissler, Olds & Lowe, PLLC

(57) ABSTRACT

A method and a system for streaming multi channel digital isochronous data. The method is used for streaming multi channel digital isochronous data, e.g. audio data, in a standard wireless local area network transmission system where bandwidth is reserved for both contention-based traffic and contention free traffic and the audio data formed by samples is organized in audio frames and sent to receivers using multicasting, within consecutive beacon intervals. The contention free traffic of the beacon interval is adjusted to an optimum value, and the length of the beacon interval is adjusted such that a required amount of audio data can be sent to the receivers with minimum system delay.

19 Claims, 26 Drawing Sheets

U.S. PATENT DOCUMENTS

| | | | |
|---|---|---|---|
| 7,158,531 B2 * | 1/2007 | Barton | 370/442 |
| 8,014,372 B2 * | 9/2011 | Ho et al. | 370/338 |
| 8,260,091 B2 * | 9/2012 | Kwon et al. | 382/309 |
| 2002/0025818 A1 | 2/2002 | Kang et al. | |
| 2002/0071449 A1 | 6/2002 | Ho et al. | |
| 2004/0117497 A1 | 6/2004 | Park | |
| 2006/0253279 A1 * | 11/2006 | Sung | 704/221 |
| 2008/0095072 A1 * | 4/2008 | Shao et al. | 370/254 |
| 2009/0046613 A1 * | 2/2009 | Gaur | 370/312 |

FOREIGN PATENT DOCUMENTS

| WO | WO-0171980 A1 | 9/2001 |
|---|---|---|
| WO | WO-2005/020634 A1 | 3/2005 |
| WO | WO-2006/033744 A1 | 3/2006 |

* cited by examiner

| Index | Samples in Buff 1 | Samples in Buff 2 | Samples in Buff 3 | Samples in Buff 4 | Samples in Buff 5 | Samples in Buff 6 | Samples in Buff 7 | Samples in Buff 8 | Samples in Buff 9 | Samples in Buff 10 | Samples in Buff 11 | Samples in Buff 12 |
|---|---|---|---|---|---|---|---|---|---|---|---|---|
| 0 | 51 | 49 | 49 | 49 | 49 | 49 | 49 | 49 | 49 | 49 | 49 | 49 |
| 1 | 51 | 49 | 49 | 49 | 49 | 49 | 49 | 49 | 49 | 49 | 49 | 49 |
| 2 | 50 | 49 | 49 | 49 | 49 | 49 | 49 | 49 | 49 | 49 | 49 | 49 |
| 3 | 51 | 49 | 49 | 49 | 49 | 49 | 49 | 49 | 49 | 49 | 49 | 49 |
| 4 | 51 | 49 | 49 | 49 | 49 | 49 | 49 | 49 | 49 | 49 | 49 | 49 |
| 5 | 51 | 49 | 49 | 49 | 49 | 49 | 49 | 49 | 49 | 49 | 49 | 49 |
| 6 | 51 | 49 | 49 | 49 | 49 | 49 | 49 | 49 | 49 | 49 | 49 | 49 |
| 7 | 51 | 49 | 49 | 49 | 49 | 49 | 49 | 49 | 49 | 49 | 49 | 49 |
| 8 | 50 | 49 | 49 | 49 | 49 | 49 | 49 | 49 | 49 | 49 | 49 | 49 |
| 9 | 51 | 49 | 49 | 49 | 49 | 49 | 49 | 49 | 49 | 49 | 49 | 49 |
| 10 | 51 | 49 | 49 | 49 | 49 | 49 | 49 | 49 | 49 | 49 | 49 | 49 |
| 11 | 51 | 49 | 49 | 49 | 49 | 49 | 49 | 49 | 49 | 49 | 49 | 49 |
| 58 | 51 | 49 | 49 | 49 | 49 | 49 | 49 | 49 | 49 | 49 | 49 | 49 |
| 59 | 50* | 49 | 49 | 49 | 49 | 49 | 49 | 49 | 49 | 49 | 49 | 49 |
| 60 | 51 | 49 | 49 | 49 | 49 | 49 | 49 | 49 | 49 | 49 | 49 | 49 |
| 121 | 51 | 49 | 49 | 49 | 49 | 49 | 49 | 49 | 49 | 49 | 49 | 49 |
| 122 | 50 | 49 | 49 | 49 | 49 | 49 | 49 | 49 | 49 | 49 | 49 | 49 |
| 123 | 51 | 49 | 49 | 49 | 49 | 49 | 49 | 49 | 49 | 49 | 49 | 49 |
| 124 | 51 | 49 | 49 | 49 | 49 | 49 | 49 | 49 | 49 | 49 | 49 | 49 |

Dominant Block Size is 49

Inner Repeating Sequence of 6 x 12

Outer Repeating Sequence of 125 x 12

Exceptional 60th (#59) Buff 1 has 50 Sample Records instead of 51

Number of 8 x 32 Bit Sample Records in Consecutive Data Blocks

Fig. 23

METHOD AND SYSTEM FOR WIRELESS REAL-TIME TRANSMISSION OF MULTICHANNEL AUDIO OR VIDEO DATA

BACKGROUND OF THE INVENTION

1. Field of the Invention

The invention relates to a method for streaming multi channel digital isochronous data for wireless transmission for mainly audio purposes. The invention relates also to a system for streaming digital serial audio data for wireless transmission for audio purposes.

The invention relates to an error control method and system and a synchronization method and system.

The subject of this invention is typically a system with the associated apparatus and method for the isochronous, electromagnetic disturbance resistant, wireless transfer of highest studio-quality multi-channel digital audio. This same method can also be used as the basis of the multicast transmission of other digital information with the same kind of real-time and bandwidth requirements such as live digital video and television signal distribution over the local area.

2. Brief Discussion of the Related Art

With the currently known technique, the studio-quality multi-channel digital audio signal is first converted to the analog form and then transferred to loudspeakers with the per-channel electrical cables. Also, a digital transmission method in electrical cables or optical fibres, is known. If the loudspeakers are passive, an additional amplifier for each loudspeaker is required to amplify the signal power at the transmitter and to feed the transmission cable line with enough power to drive the loudspeakers at the appropriate sound level. All these manipulations, as well as the physical analog transmission path itself, inject several degrading effect such as noise, interference, distortion, group delays, amplitude and phase errors, to the quality of the original signal. The cabling is often clumsy and can be messy looking. With careful design of cables and their wiring layout, these effects can be limited to some extent but seldom completely overcome. The number and bulkiness of the cables, the need for careful design and tedious installation work increase the costs as well as required skills and time. Cables and their electromechanical connectors are also prone to mechanical faults, which are hard to find and fix. These problems are especially harmful in public performances when the performers and often even the audience move among the cables. Under these conditions, there can be a real hazard of harm and injury with the cabling. During artistic tours, the audio equipment is installed and uninstalled frequently to and from varying environments, which multiplies these problems, efforts, and costs.

The use of active loudspeakers, having integrated and optimised amplifiers within them, simplifies the situation to some degree. The analog signals can now be of lower power level and the more noise and interference resistant differential signalling can be readily employed. The generation of multi-channel differential signals requires, however, rather expensive high-quality analog electronics plus costly differential cabling and connectors.

The currently available wireless audio distribution systems are non-standard radio or infrared solutions typically using lossy audio compression methods thus resulting compromised performance. They are therefore mainly used for supportive purposes such as for rear speakers in home theatres.

SUMMARY OF THE INVENTION

The aim of this invention is to solve problems relating to the isochronous real-time transmission of the highest studio-quality streaming digital audio data associated with the techniques described above by constructing a novel, international standards compliant wireless local area network (WLAN) based data communication system, transmitter, receiver plus the necessary firmware and software for the efficient restricted area distribution of digital audio and the testing, configuration, management and control of such system.

The invention is based on the idea that the digital information is transferred using multicasting from the central transmitter station to the individual loudspeakers in the studio-quality digital format with electromagnetic radio waves or through power line wiring and without dedicated signal cables using typically internationally standardized and high-volume produced wireless local area networking (WLAN) components. The digital signal is converted to the analog form only at the active loudspeaker unit itself and finally fed locally to the optimised electronic low-pass, band-pass and high-pass filters, amplifiers and finally to the high-quality loudspeaker elements. This guarantees the ultimate sound quality. Because of the application of the mass-produced WLAN technique and its commercial components and the very small number of additional standard integrated circuits, the cost of the development work and the actual system can be kept very reasonable.

The method introduced here replaces the wired lines with the standard commercial wireless local area network technology as specified in the IEEE 802.11 series of standards. The special characteristics required for the uncompressed real-time transfer of multi-channel studio-quality audio have been implemented by the innovative choice of WLAN system coordination functions, communication modes, and control parameters together with a special upper layer firmware.

In accordance with a preferred embodiment of the invention the audio data formed by samples is organized in audio frames and sent to receivers within consecutive beacon intervals, using multicast messaging. According to the WLAN standards, two co-existing modes of operation are possible. The usual mode, widely used in commercial data communication products, is called the contention-based service. The other mode, used seldom but accurately specified in the IEEE 802.11 standard, is called contention-free service, and it is the basis for this invention. Beacon frames are used to control the switching between these two modes of operation. The length of the beacon interval is a programmable parameter and it is adjusted with this invention so that an optimum amount of isochronous audio data can be sent to the receivers, with minimum system delay. This optimum amount is in one preferred embodiment of the invention a required amount of isochronous audio data for high quality audio reproduction.

In accordance with another preferred embodiment of the invention, an enhanced error control system optimised for isochronous audio transfer either minimizing the need or totally eliminating the need for retransmissions is used, where the received signal contains an error control data block, used for error correction purposes.

In accordance with a third preferred embodiment of the invention, the receivers are synchronized in a multicast system with the help of an end-of-frame interrupt, generated by the control frame terminating each beacon interval, at the exactly same instance within each beacon interval.

More specifically, the method according to the invention is characterized in that the contention free traffic of the beacon interval is adjusted to an optimum value such that enough bandwidth is reserved for the contention-free isochronous audio traffic, the system delay and buffering requirements are minimized, and a maximum bandwidth for the contention-based traffic is assured, in addition to the contention-free isochronous audio traffic.

Further, the system according to the invention is characterized in that the contention free traffic of the beacon interval is adjusted to an optimum value such that enough bandwidth is reserved for the contention-free isochronous audio traffic, the system delay and buffering requirements are minimized, and a maximum bandwidth for the contention-based traffic is assured, in addition to the contention-free isochronous audio traffic.

With the help of the invention significant benefits may be obtained.

With the per-loudspeaker reception of the studio-quality digital audio, all the error factors associated to the traditional loudspeaker signal path can be avoided. Performing the digital-to-analog conversion just at the active loudspeaker itself maximizes the sound quality by localizing the propagation path of the analog signal on the fixed and optimized active loudspeaker circuitry in accordance with one embodiment of the invention.

The signal cables, their connectors and differential signal transmitter/receivers and related material and installation work can be completely avoided. This eliminates all the cost, failure, and installation problems associated with them. As mass produced standard WLAN technique is the basis of the invention, its production cost can be very low in accordance with one embodiment of the invention.

As multicast transmission mode and frequent multicast synchronization are utilized, the inter-channel phase errors can be effectively eliminated in accordance with one embodiment of the invention.

As optimized transmission frame size is used, the system level delay can be minimized to an insignificant level in accordance with one embodiment of the invention.

With the help of the error control method in accordance with one embodiment of the invention a simple and fast best-effort error correction scheme can be obtained.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention.

FIG. 23 shows as a table the number of 8×32-bit sample records in consecutive data blocks in accordance with the invention, relating to proper sequencing of digital audio for transmission.

Figure 1:
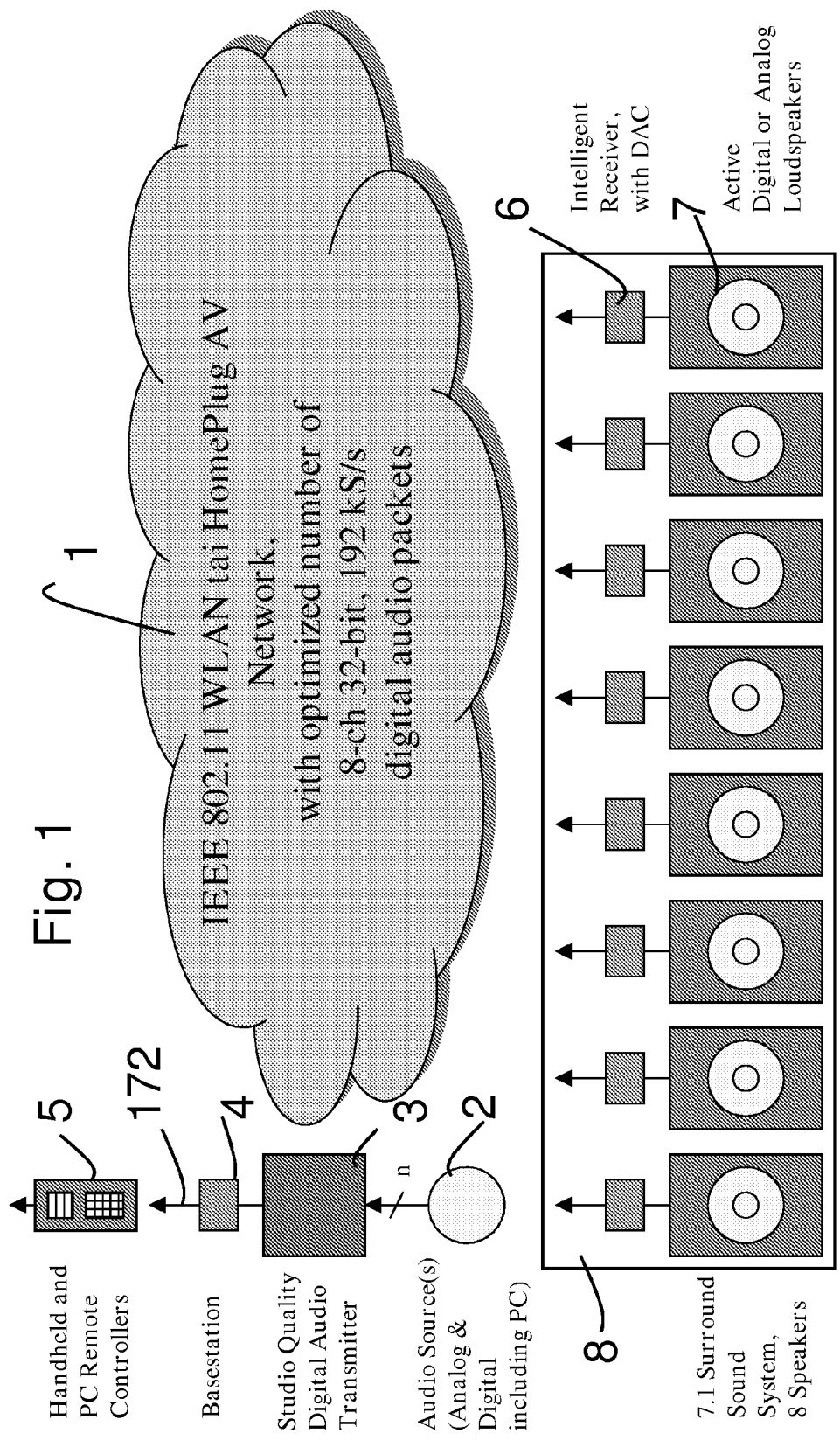
FIG. 1 shows as a block diagram a general system configuration of the invention.

In this document, the following terms will be used in connection with the inventions.

1 WLAN, Wireless Local Area Network
2 Audio source
3 Digital Audio Transmitter
4 Base station
5 Remote controller
6 receiver
7 loudspeaker, typically an active loudspeaker with inbuilt power amplifier
8 Sound (e.g. Surround) system
9 audio data format/sample
10 transmission level audio data format
11 error correction code
12 MAC sublayer, MAC=Medium Access Control
13 Distributed coordination function
14 Point coordination function
15 Contention-free communication services
16 Contention-based communication services 17 General MAC frame structure
18 Frame control
19 Duration/ID
20 Address 1
21 Address 2
22 Address 3
23 Sequence Control
24 Address 4
25 Frame body
26 FCS, Frame Control Sequence
27 MAC Header
28 MAC Frame
29 WLAN frame control field
30 Protocol version
31 type
32 Subtype
33 To DS, DS=Distribution System
34 From DS
35 More Frag
36 Retry
37 More data
38 Pwr Mgt
39 WEP, Wired Equivalent Privacy
40 Order
41 Individual Address
42 Group Address
43 Unicast Address
44 Multicast address
45 Broadcast address
46 Generic Beacon Frame
47 Frame control
48 Duration
49 Destination address
50 Source address
51 BSS ID
52 Sequence control
53 Frame body
54 FCS
55 Time stamp
56 Beacon interval
57 Capability info
58 SSID, Service Set IDentity
59 Optional fields
60 Beacon frame as used in this invention
61 Frame control
62 Duration
63 Destination address
64 Source address
65 BSSID, Basic Service Set IDentity
66 Sequence control
67 Frame body
68 FCS
69 Time stamp
70 Beacon interval
71 Capability info
72 SSID
73 CF parameter set
74 TIM, Traffic Indication Map
75 ERP, Extended Rate PHY
76 Extended rates
77 Element format
78 Element ID
79 Length
80 Information
81 TIM element
82 Element ID
83 Length
84 DTIM Count, DTIM=Delivery Traffic Indication Map
85 DTIM Period
86 Bitmap Control
87 Partial Virtual Bitmap
89 ERP information element
90 Element ID
91 Length
92 Non ERP-present
93 Use protection
94 Barker Preamble mode
95 r3-r7
96 Extended Supported Rates element format
97 Element ID
98 Length
99 Extended Supported rates
100 CF Parameter Set element format, CF=Contention-Free
101 Element ID
102 Length
103 CFP Count
104 CFP, Contention-Free Period
105 CFP Max Duration
106 CFP DurRemaining
107 CF-End frame
108 MAC-header
109 CF-end MAC Frame
110 frame control
111 Duration
112 RA, Receiver Address
113 BSSID
114 FCS
115 ERP-OFDM PHY Frame structure, OFDM=Orthogonal Frequency Division Multiplexing
116 Coded/OFDM
117 PSDU, Protocol Service Data Unit
118 PLCP Preamble
119 SIGNAL
120 Rate
121 Reserved
122 LENGTH
123 Tail
124 Parity
125 Service
127 Frame control
128 Duration/ID
129 Address 1
130 Address 2
131 Address 3
132 Sequence Control
133 Address 4
134 Frame body
135 FCS
136 Area of interest
137 WLAN Repetition period/Beacon interval (N*TU)
138 Foreshortened contention-free Period
139 Multiplexer and receiver
140 Serial to parallel converter
141 Buffer
142 USB host controller, USB=Universal Serial Bus
143 USB inputs
144 S/PDIF-inputs, S/PDIF=Sony/Philips Digital InterFace
145 Analog inputs
146 Analog buffers and multiplexers
147 A/D-converters, A/D=Analogue-to-Digital
148 MAC/baseband Processor
149 Microcontroller
150 D/A-converter and filter, D/A=Digital-to-Analogue
151 Select analog input 152 A/D-conversion
153 Select Digital input
154 24-bit reformatting
155 Select audio input
156 Number of channels 8
157 No
158 Yes
159 generate FEC and write to buffer, FEC=Forward Error Correction
160 Calculate missing channels
161 generate FEC and write to buffer
162 sample i−1
163 sample i
164 sample i+1
165 corrected sample i
166 ESS, Extended Service Set
167 IBSS
168 CF Pollable
169 CF Poll Request
170 Privacy
171 Reserved
172 Antenna
173 Most significant bits
174 Audio MAC frame
175 Control MAC frame

DETAILED DESCRIPTION OF THE PREFERRED EMBODIMENTS

System

In accordance with FIG. 1, the system comprises one or several audio sources 2, which may be either digital or an analog sources, including also a possibility for a direct computer connection e.g. via USB-interface. The source 2 is connected to audio transmitter 3, which is further connected to a base station 4, which includes an antenna arrangement 172 for wireless transmission. The transmitter 3 and base station 4 are typically controlled by a remote controller 5 or a computer. The signal from the base station 4 is sent via a WLAN network 1 using by isochronous multicast messages to the receivers 6 of a multi channel (e.g., surround) sound system 8, including several loudspeakers 7. In other words the audio data from sources 2 is transformed into digital data by elements 3 and 4 and transferred to the loudspeaker receivers as standard WLAN digital data.

Transmitter Base Station

Figure 2:
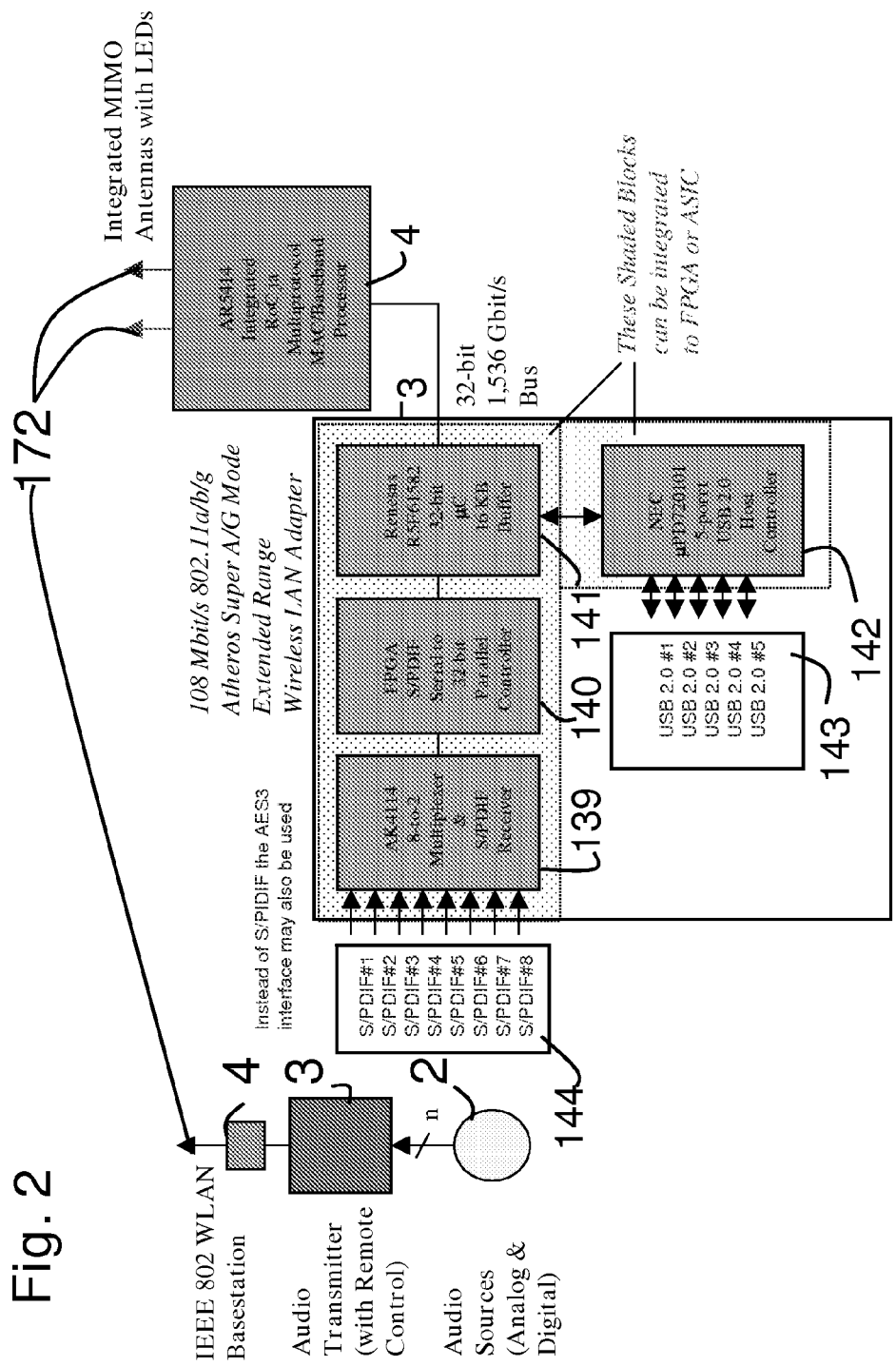
FIG. 2 shows as a block diagram an example transmitter base station in accordance with the invention.
Figure 3:
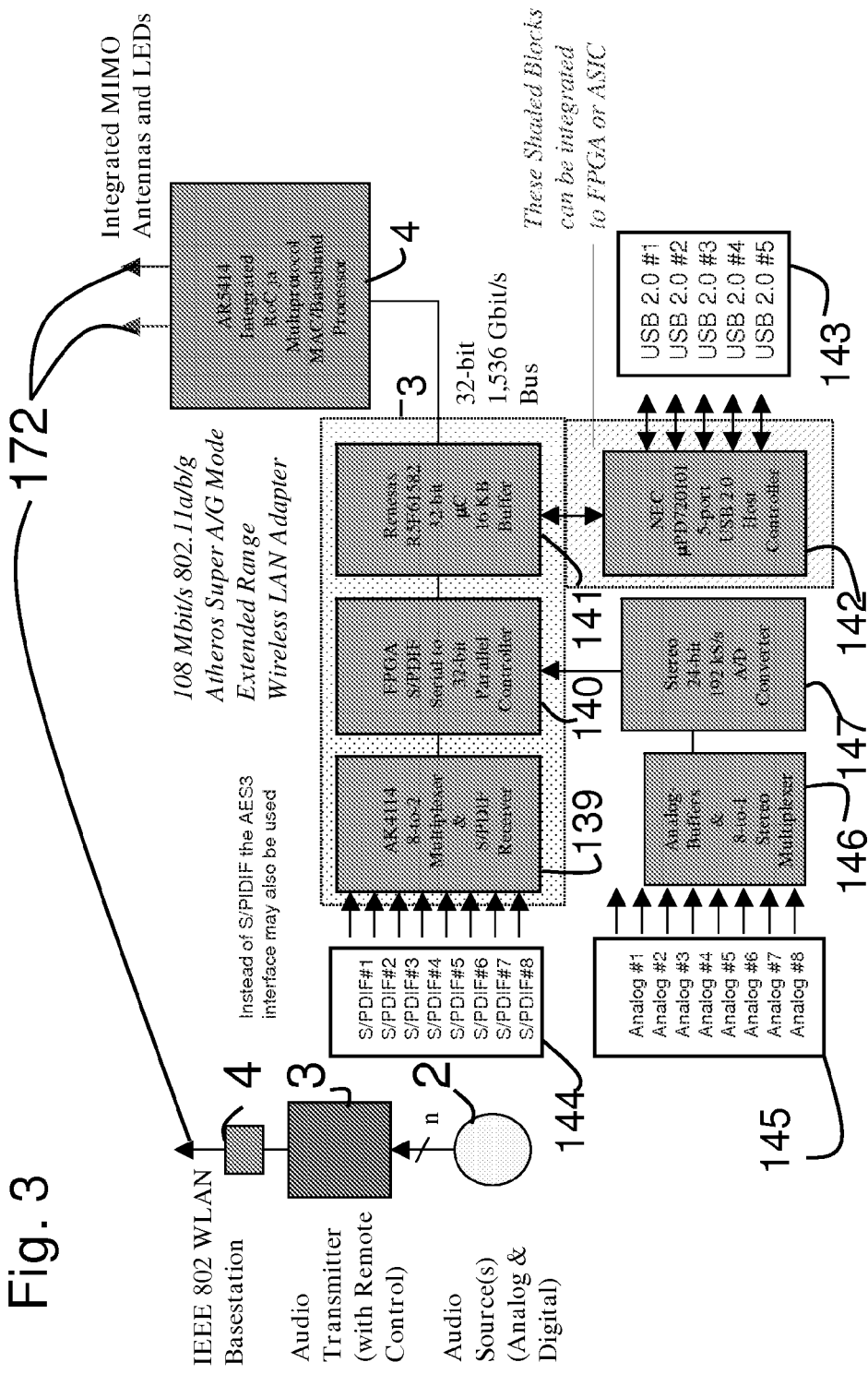
FIG. 3 shows as a block diagram another example transmitter base station in accordance with the invention.

FIG. 2 shows a simple example version of the transmitter 4 not including the analog inputs and FIG. 3 shows a device with analog inputs 145. The transmitter base station 4 is typically a 108 Mbit/s extended IEEE 802.11g WLAN MIMO Access Point station, which receives a specified number of monaural, stereo, or multi-channel analog and AES3, S/PDIF, or USB digital audio signals. 108 Mbit/s is practically the lowest possible standard bit rate for the system of this invention. In the future, higher WLAN transmission speeds are expected. They will make it possible to improve the error correction methods using retransmissions. The analog inputs 145 are electrically buffered 146 and fed to an analog selector that can select one of the stereo inputs for a stereo 24-bit, 192 kS/s A/D converter 147, serial-to-parallel converter 140, and programmable 2-to-8-channel DSP processor. The DSP processing makes it possible to perform any kind of matrixing to generate the derived channel signals from the right and left channel stereo signals. Alternatively, if a digital AES3 or S/PDIF input 144 was selected instead, it is converted to the parallel format with a shift register 140 and then fed via the memory buffer 141 to the 32-bit digital signal processor 4 that formats the signal to the 8-channel 24-bit 192 kSample/s parallel format used in the WLAN transmission. The use of the USB 2.0 interface 143 allows the direct input of the 8-channel 24-bit 192 kSample/s audio stream which is then directly stored to the parallel 32-bit memory format. Resampling from lower sampling rates to 192 kSample/s can be done for example with the four-sample third-order polynomial curve fitting method by the DSP together with precision extension from possible shorter sample sizes to 24-bits. After these processing steps the forward error correction code octet 11 (FIGS. 6 and 7) is appended in front of each 24-bit audio sample 9. The resulting 32-bit samples are buffered into the memory for transmission in records of eight samples 9 representing the simultaneous samples from the eight audio channels.

Within the transmitter station 3 there is a 16 KB memory ring buffer 141 or FIFO buffer for the intermediate storing of the incoming data waiting for transmission. After initialization the transmitter station 3 uses the contention-free beacon interval setting of one TU and the CFPMaxDuration parameter is set to 512 μs. This setting is re-established when the incoming audio stream ends and minimizes the reaction time to the incoming audio stream and therefore also the memory buffer sizes. Alternatively it is possible to stuff the audio stream by filling the buffer with all-zero data when there is no incoming audio. When the audio data stream is started and there is no more than 6.6 KB of space available for incoming data in the ring or FIFO buffer, the contention-free interval is reprogrammed to three TUs and the CFPMaxDuration parameter set to 2,782 μs. The WLAN digital audio transmission is started at this point as well. Depending on the WLAN traffic situation, it may take from 459 to 1,483 μs for the first audio data to be transmitted, at which time from 2.8 KB to 9.2 KB more audio data has entered into the buffer. The input buffer size requirement limits are therefore from 9.4 KB to 15.8 KB depending on timing relationships between audio sources and the WLAN. For this reason, the 16 KB ring buffer 141 or FIFO is sufficient for all situations. The buffer 141 is filled with the incoming audio data by the signal processor and the audio data is transmitted from the buffer 141 with the help of a timer controlled DMA controller or another processor maintaining the correct WLAN data transfer rate. There is a high-speed parallel or serial standard interface between the processor and the WLAN chip, and the software application program interface (API) of the WLAN chip is used for the traffic control as described above. The maximum delay caused by the transmission is approximately 1,500 μs. In addition to this, there is the reception buffering delay of approximately 500 μs. The total delay is thus no more than 2,000 μs. This corresponds to the propagation of sound for less than one meter, making the delay insignificant for human hearing experience.

The WLAN part of the base station (and the receivers) conforms to the IEEE 802.11g standard with the range and transmission rate extensions introduced by Atheros Inc. and Airgo Inc. A MIMO antenna arrangement 172 is typically also used. The nominal bit rate is 108 Mbit/s. These implementations of the extended IEEE 802.11g WLANs also contain a powerful transmission error correction mechanism that effectively distributes the eventual transmission path burst errors to single bit reception errors at reception and is capable of correcting all of them on the octet level. This feature is taken advantage of in the specified application layer forward error correction method.

Contention-based, individually addressed messaging between the base station 4 and the receiver stations is used for the configuration, status monitoring, and control of the receivers as well as the audio equipment attached to them. There is an infrared handheld remote controller receiver, a USB 2.0 computer communication receiver/transmitter and a USB 2.0 general-purpose receiver/transmitter for Bluetooth and WLAN handheld remote controller adapters in the transmitter base station 4.

System Configuration, Monitoring, and Control

The system configuration, monitoring and control are done from the handheld remote controller(s) or from a (personal) computer application(s) as described above.

Receivers

Figure 4:
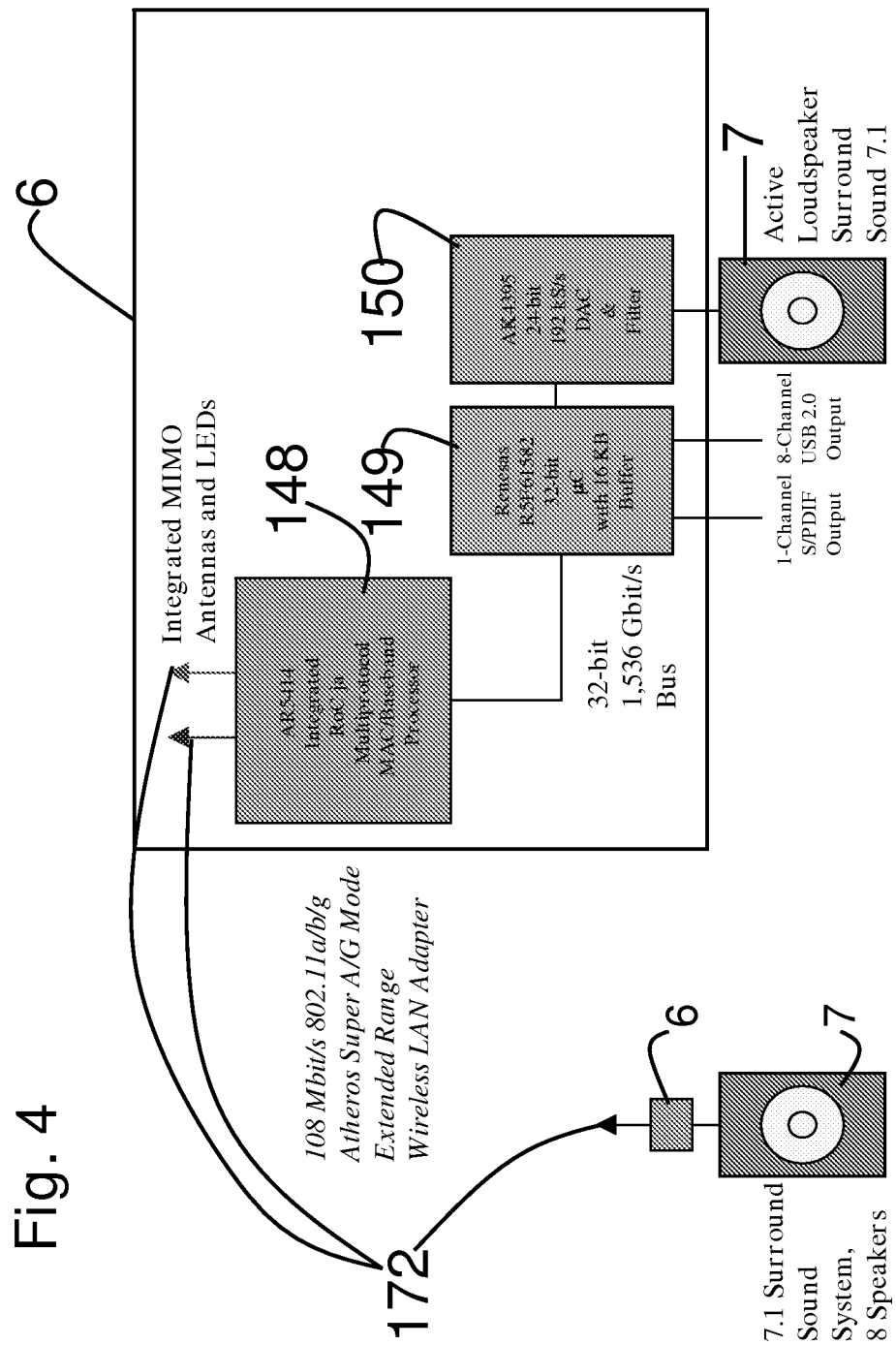
FIG. 4 shows as a block diagram an example receiver in accordance with the invention.

According to FIG. 4 the receiver 6 typically consists of a MIMO antenna subsystem 172, the IEEE 802g conformant WLAN circuit with the Atheros or Airgo range and transfer rate extensions. There are typically software controlled multicolor LEDs to aid the recognition and status of the individual loudspeakers 7 for the configuration, status monitoring and control operations. The WLAN is operated at the nominal speed of 108 Mbit/s. The received audio data stream is buffered into a 16 KB input ring or FIFO memory buffer and the audio output from the buffer is started when the buffer reaches the limit of 6.6 KB. The data of the currently selected channel of this receiver is selected by the 32-bit processor 149 and fed to a 24-bit D/A converter 150 followed by a top quality volume control circuit and buffer amplifier to generate the studio-quality analog audio signal for the selected audio channel of this particular audio receiver unit. The channel selection is done by the configuration and control software over the contention communication service of the WLAN.

The receivers 6 of the eight channels each have an internal crystal-derived clock to generate the 192,000 Samples/s clock. These clocks are restarted by the end-of-frame interrupt generated by the CF-End control message of each of the 3,072 μs reception slot. The differential analog output signal from the D/A conversion is the differential input of the active loudspeaker of the configured channel. In addition, the full eight-channel digital audio is made available from standard AES3 (S/PDIF) coaxial and optical outputs. This facilitates the implementation of wireless studio-quality 8-channel digital audio links. Another AES3 (S/PDIF) coaxial and optical output pair is provided for the active loudspeakers having a digital input.

Remote Control Terminals

Two methods exist for the control of the system, a battery-powered handheld control terminal 5 and a software application available for several platforms including Linux, MS Windows, Apple, and Symbian operating systems.

Handheld Remote Controller

The handheld remote controller 5 contains a keypad, a small display, a processor and a communication link to the base station. The keypad functions allow the selection of the audio source 2, the audio loudspeaker group 8 and individual loudspeaker 7 configuration and control. Loudspeaker groups 8 as well as individual loudspeakers 7 can be smoothly activated and deactivated and their general and individual volume levels can be adjusted. The handheld remote controller communicates with the transmitter basestation 4 via an infrared, Bluetooth or WLAN link. The basestation 4 relays the controls to loudspeakers through the individual receivers using contention mode communication and either group or individual addressing. There is a panic key and function in the remote controller 5 that causes the smooth immediate muting of all loudspeakers 7.

Remote Control Software

The system described above can be fully controlled by a computer running the configuration, monitoring, and control application software. The commands and responses are communicated with the transmitter base station using a Bluetooth, IrDA, LAN, WLAN, or USB 2.0 link.

Method

Figure 5:
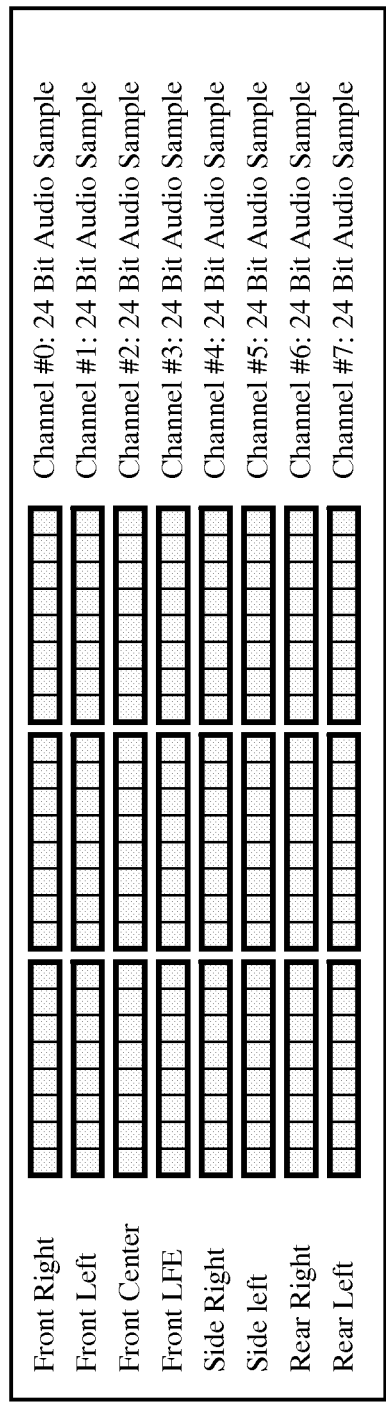
FIG. 5 shows the audio data structure representing one multi channel audio sample in accordance with the invention.
Figure 6:
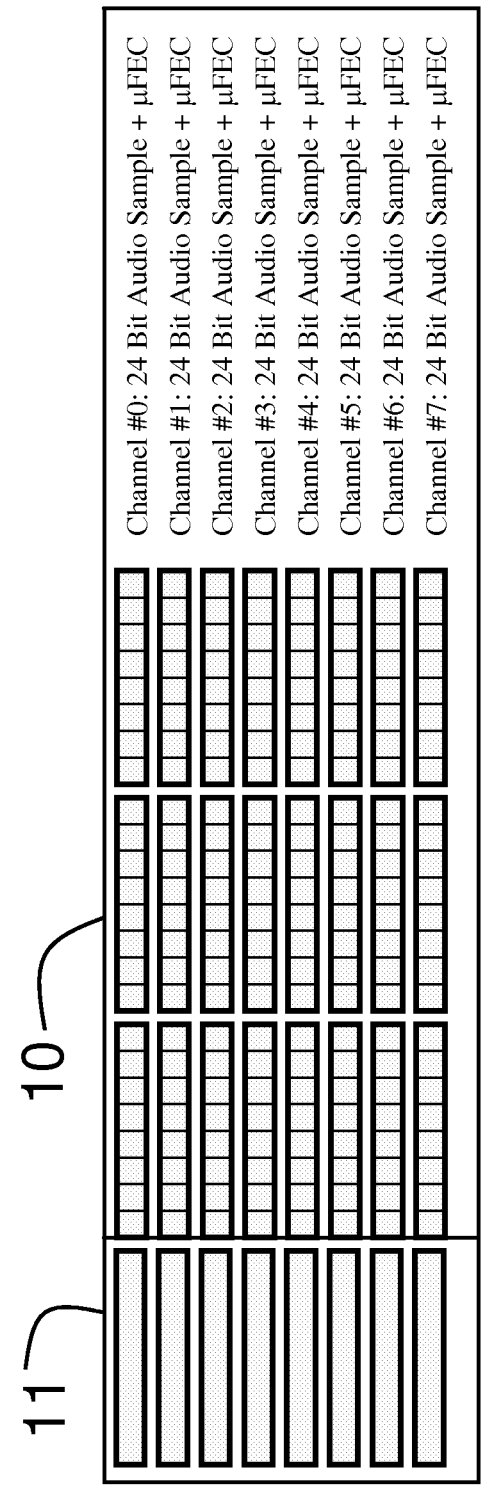
FIG. 6 shows a data structure representing one audio sample 8-tuple with the appended error control blocks in accordance with the invention.

According to FIGS. 5 and 6 the invented apparatus transmits isochronously, in real time, eight fully independent and uniform canonized uncompressed channels of 24-bit 192 000 Sample/s digital audio streams together with the efficient sound transmission specific 8-bit forward error correction (FEC) code 11 for each individual sample. A group 10 of eight discrete 24-bit samples with their associated 8-bit FEC octets 11, totalling 32 octets or 256 bits, will be called transmission level audio data format in the rest of this presentation. The sustained application level digital audio data bandwidth requirement is thus 36.864 Mbit/s. Together with the FEC octet 11, the application data bandwidth requirement becomes 49.152 Mbit/s. Additionally there are the overheads caused by the MAC framing, WEP encapsulation, PHY framing and the effect of the contention traffic time allocation. These make even the WLAN bit rate of 54 Mbit/s insufficient for this application. With today's standard WLAN techniques, the required performance cannot be achieved. The novel transmission method described below is based on the innovative use of the contention-free multicast transmission with the Point Coordination Function (PCF) as specified in the IEEE 802.11 standards. With careful parameter tuning the bandwidth of the WLAN can be optimally divided between the PCF contention-free medium access mode and the usual Decentralized Control Function (DCF) contention access mode so that the isochronous multi-channel digital audio transfer becomes possible. With the 108 Mbit/s extension of the IEEE 802.11g WLAN network and by using the ERP-OFDM PHY layer framing it is possible to transmit the aimed eight (8) independent 24+8-bit, 192 kSample/s digital audio streams isochronously together with normal contention based WLAN data traffic. The high number of channels, the high resolution, and the high sampling rate guarantee the wireless distribution of the best sound quality commercially available today.

Data Structure

Figure 24:
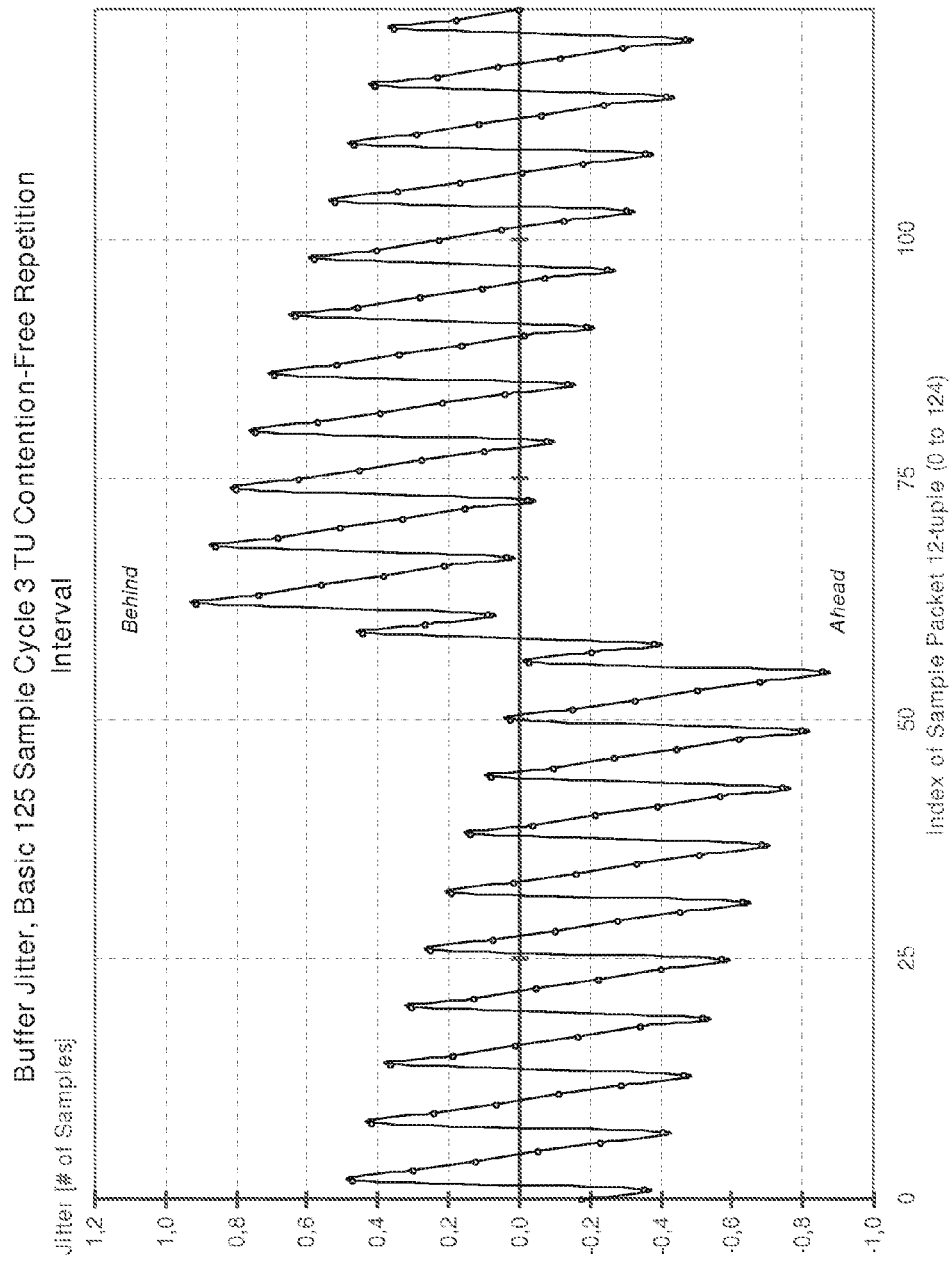
FIG. 24 shows as a graph the jitter behaviour in accordance with the invention.
Figure 25:
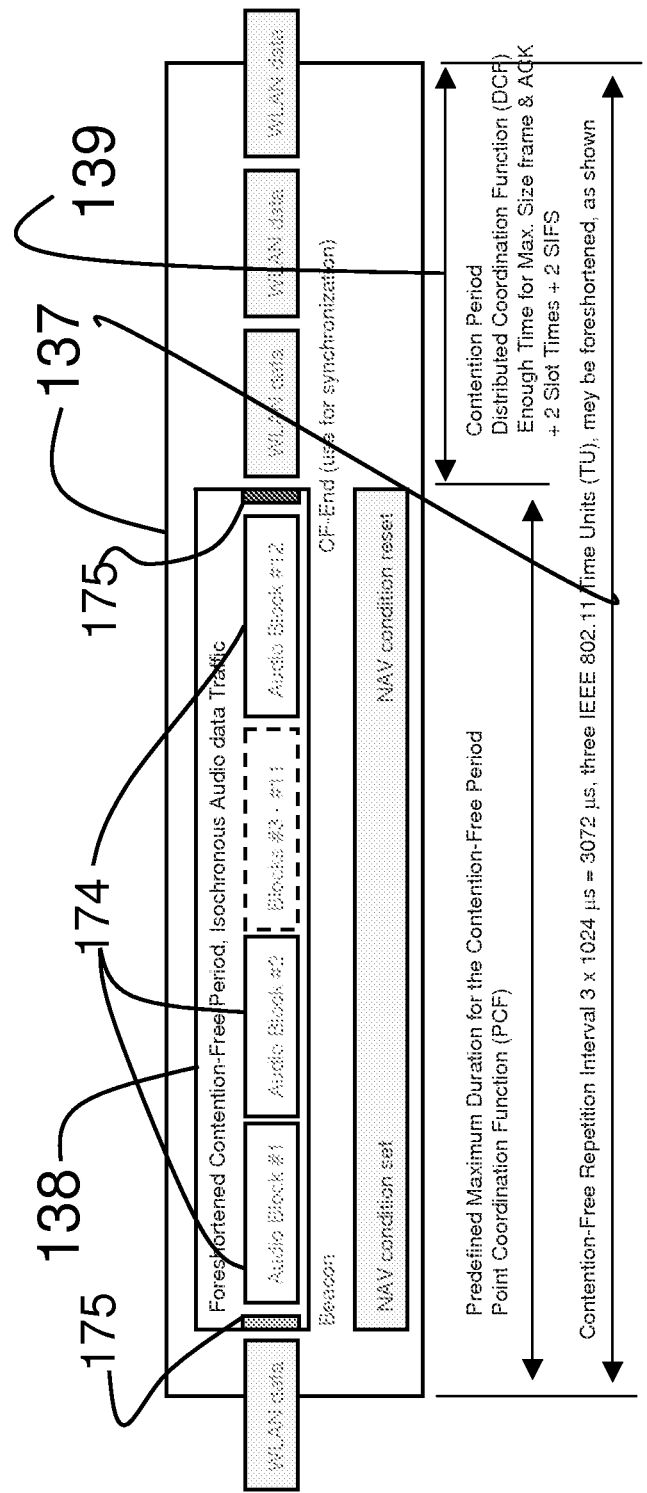
FIG. 25 shows as a block diagram a general data structure in accordance with the invention relating to the worst-case transmission timing.

According to FIG. 25 the aim of the invention is to transfer enough audio blocks (transmission level audio data format) 10 in order to produce high quality audio sound. Firstly, the beacon interval 137 defined by the software settings has to be chosen correctly in order to achieve the aim. The beacon signal, defining the length of the beacon interval 137, is sent in intervals defined by an integer in the IEEE 802.11g WLAN standard. The value of this integer may have values from 1 to N. In other words, beacon interval 137 is a product of the beacon integer and time unit (TU). The length of one TU in IEEE 802.11g WLAN standard is 1,024 μs and therefore the beacon interval 137 is a multiple of TU (1,024 μs). However, the standard defines, that in each beacon interval 137 there should be enough time reserved for the contention traffic, more precisely enough time for a maximum size frame, ACK, 2 slot times and 2 SIFS. In accordance with the invention, an optimum value for the number of time units TU for a beacon interval 137 is found to be 3. The optimum amount can be defined also as a sufficient amount in one preferred embodiment of the invention. This gives enough time to send 12 audio MAC frames 174 and 2 control MAC frames 175 within one beacon interval 137. Each audio MAC frame 174 includes 49-51 transmission level audio data format blocks 10, the number of these blocks is defined in accordance with the table of FIG. 23. In this figure one row represents the content of the audio MAC frames 174 in one contention free period 138 of a beacon interval 137. As can be seen from FIG. 23, a predetermined sequence is repeated after each 125 beacon intervals. With the help of this detailed sequence, the average flow rates of the audio input and WLAN output are matched, and the jitter can be held at the minimum, as shown in FIG. 24. This also results in a minimum requirement of buffer memory both in the transmitter and in the receivers 6.

Bandwidth Division

Figure 13:
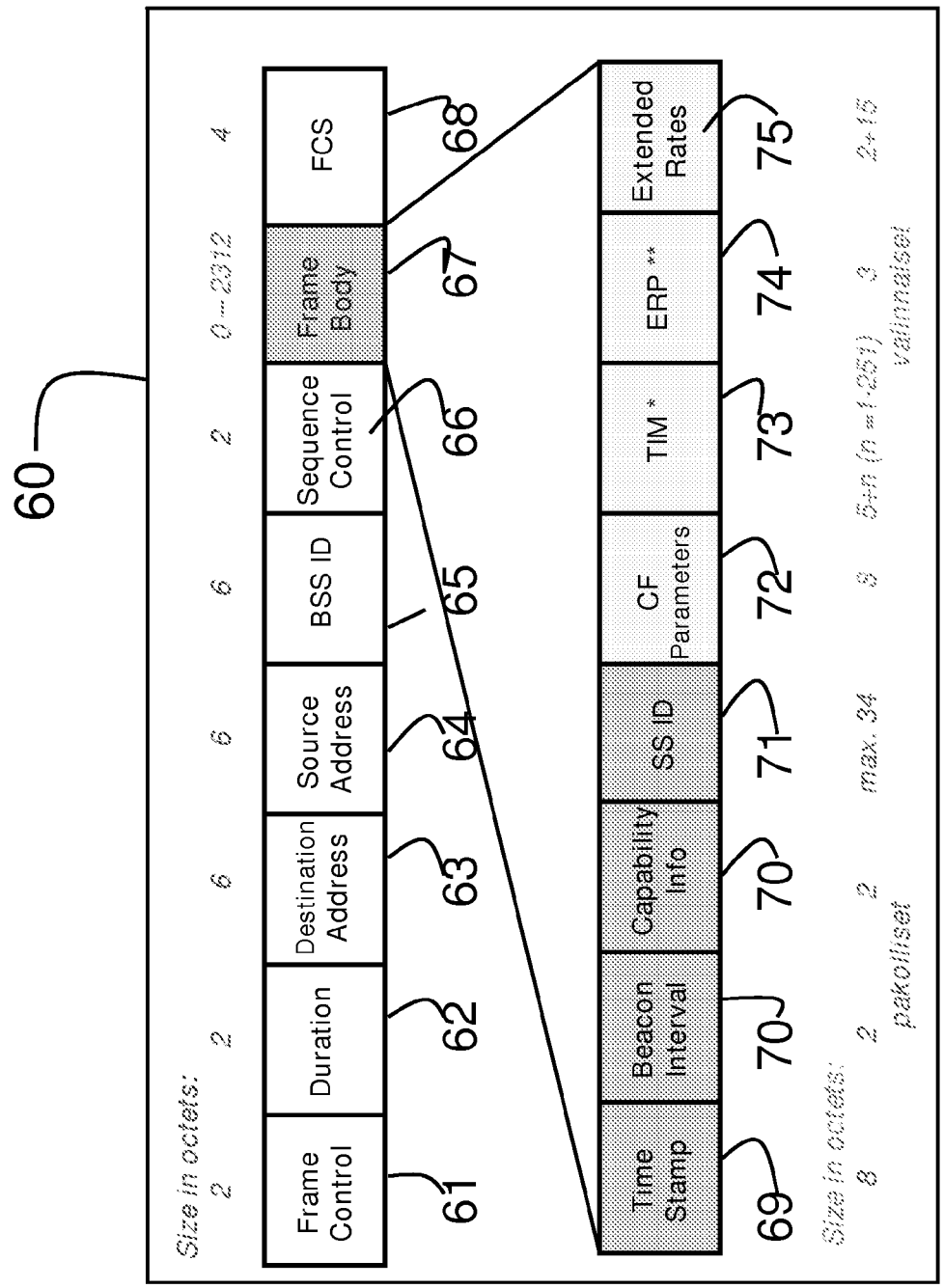
FIG. 13 shows as a data structure a beacon frame in accordance with the invention.
Figure 14:
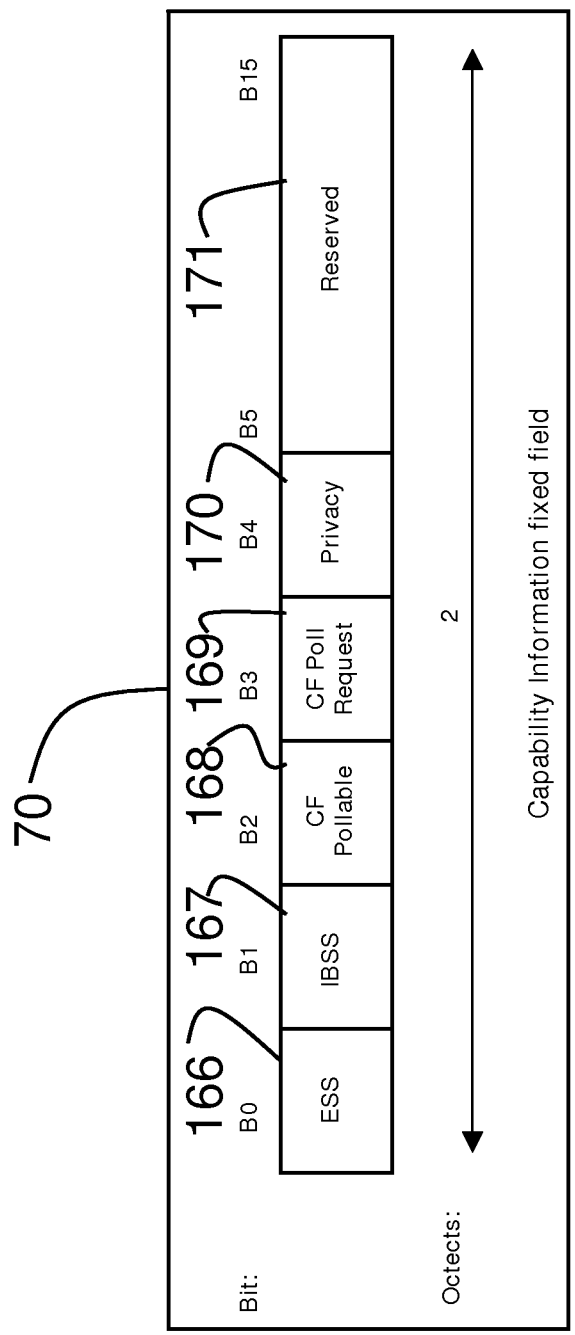
FIG. 14 shows as a data structure a capability information field, which can be used with the invention.
Figure 15:
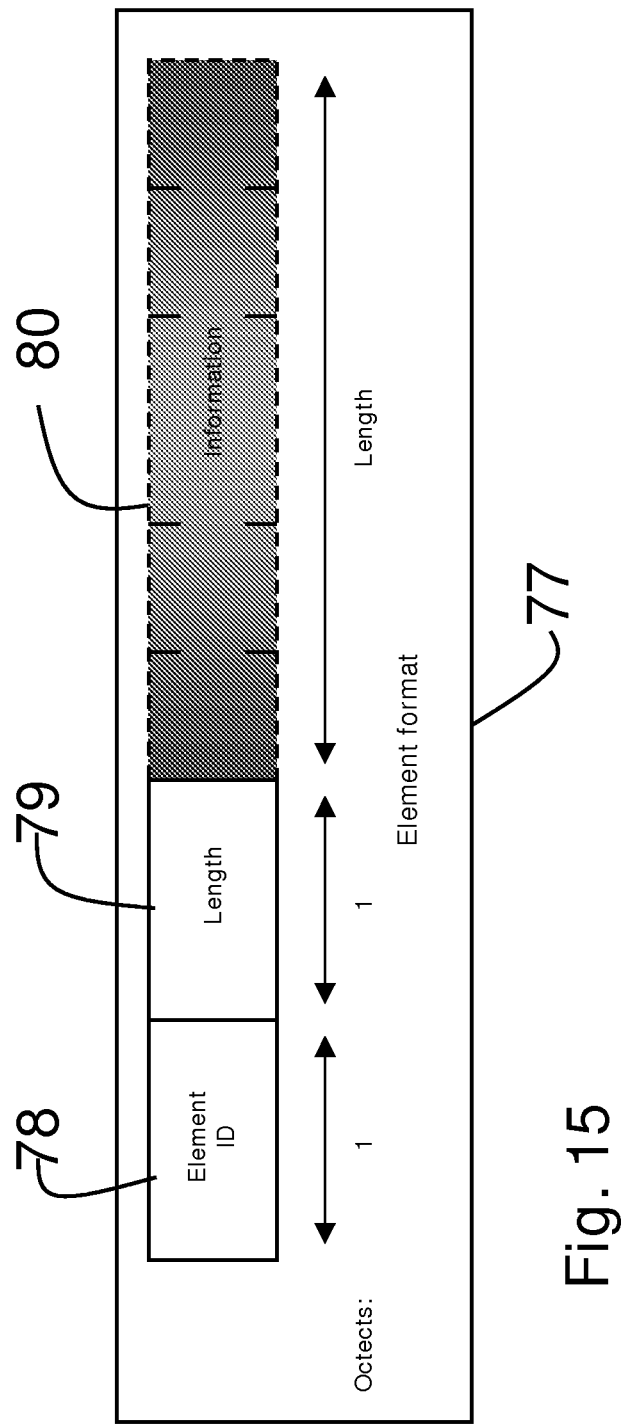
FIG. 15 shows as a data structure information elements, which can be used with the invention.
Figure 16:
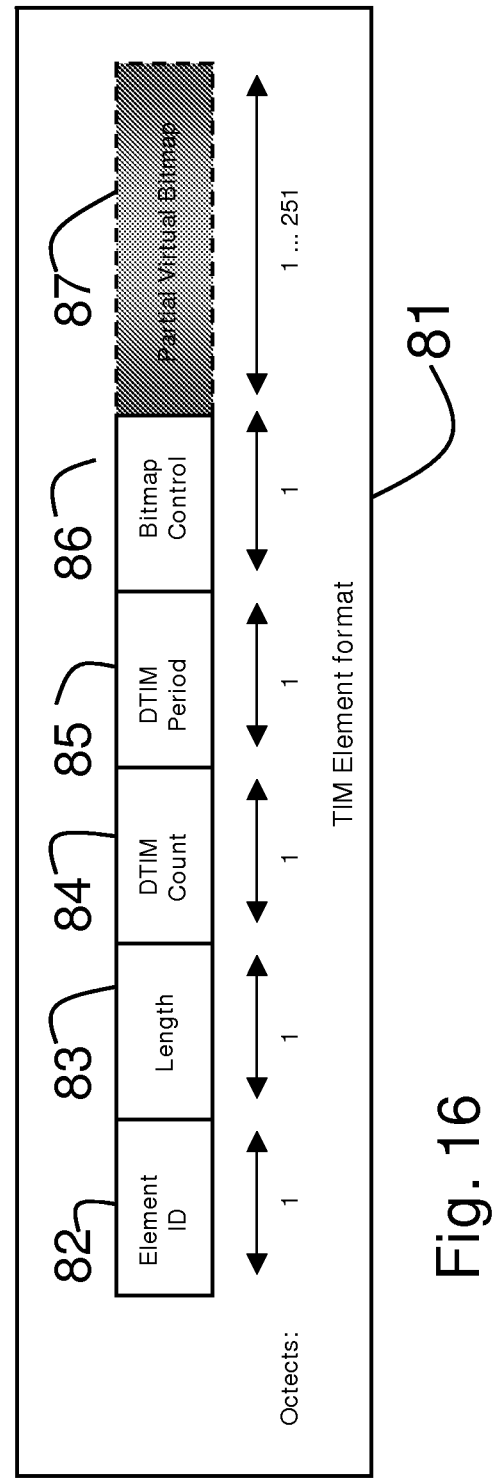
FIG. 16 shows as a data structure the Traffic Indication Map (TIM) element format, which can be used with the invention.
Figure 17:
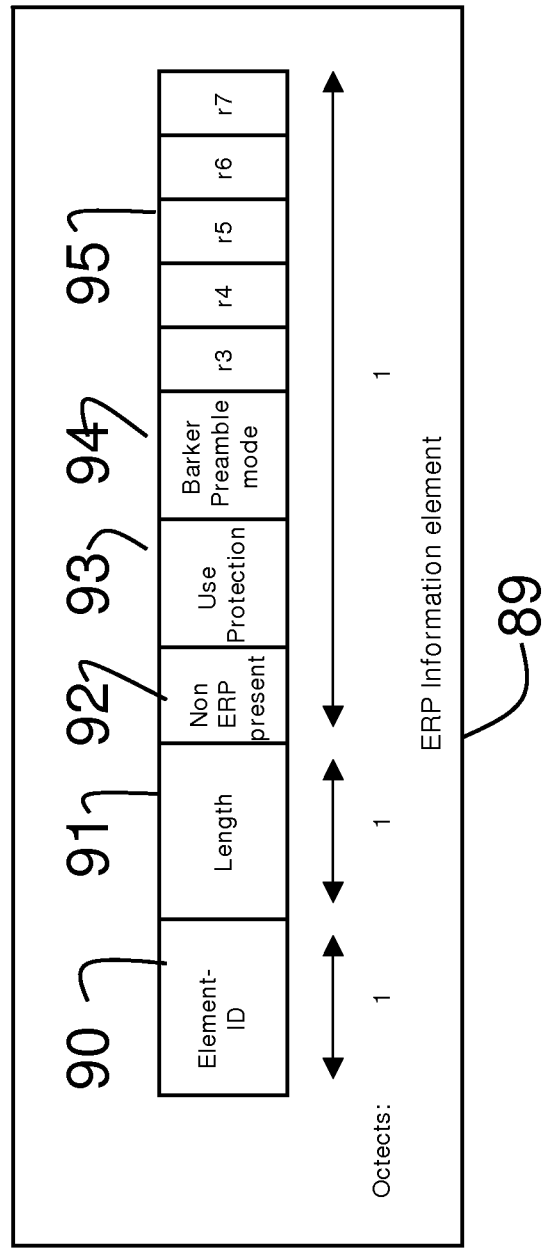
FIG. 17 shows as a data structure the Extended Rate PHY (ERP) information element, which can be used with the invention.
Figure 18:
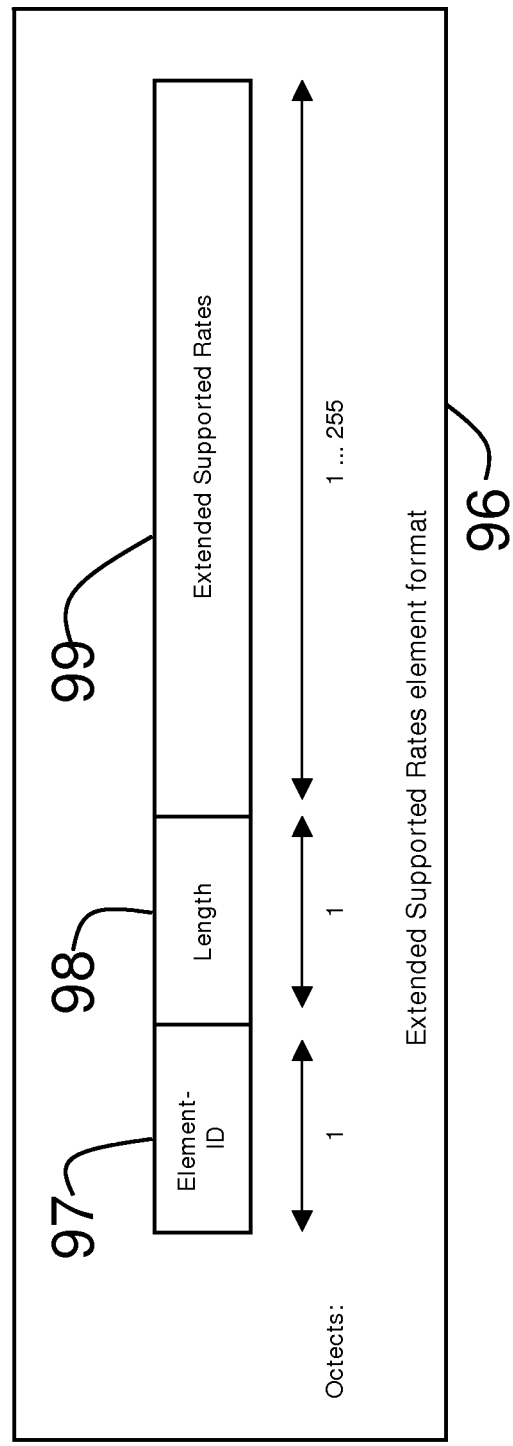
FIG. 18 shows as a data structure an extended supported rates element, which can be used with the invention.
Figure 19:
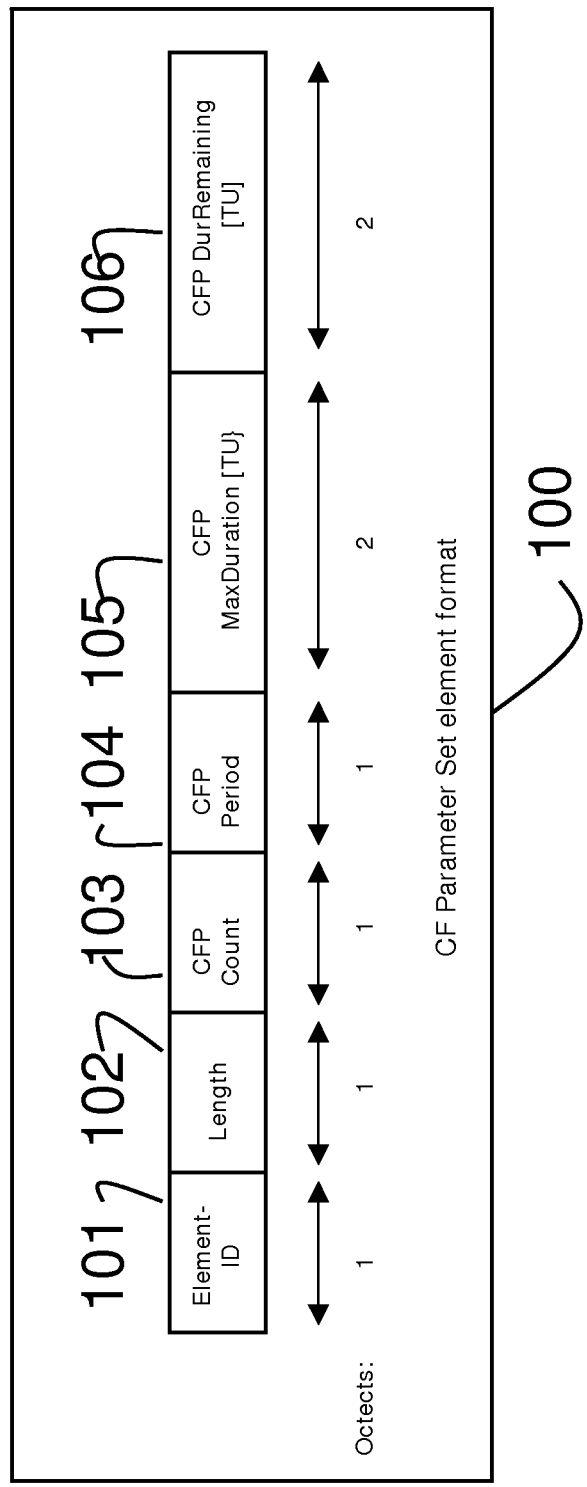
FIG. 19 shows as a data structure the Contention-Free (CF) parameter set element, which can be used with the invention.
Figure 20:
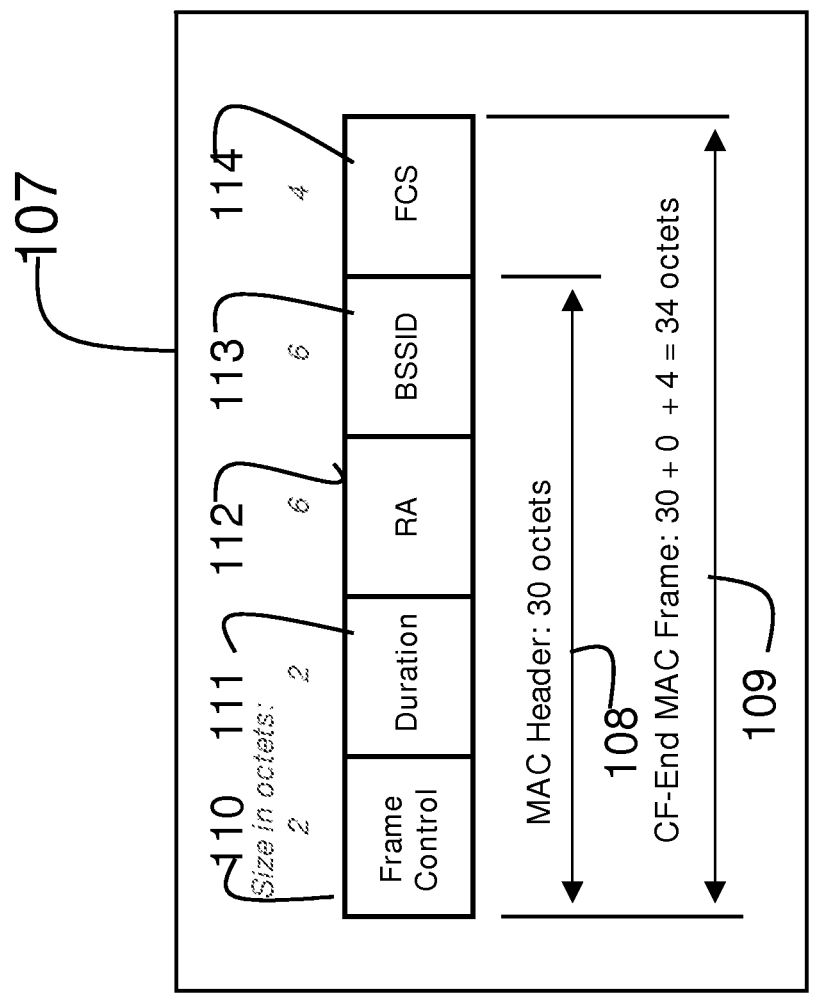
FIG. 20 shows as a data structure a CF-End Frame, which can be used with the invention.
Figure 21:
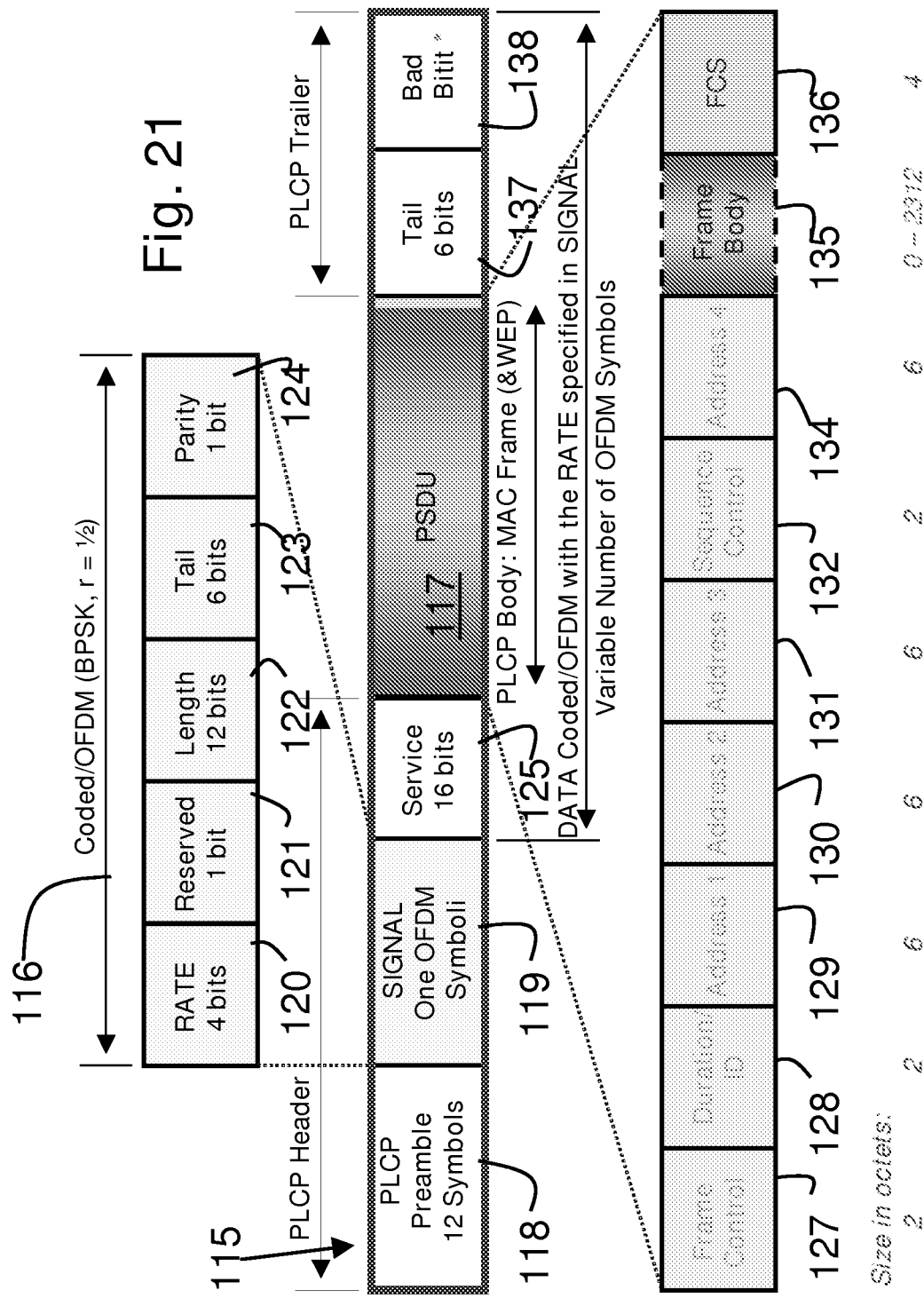
FIG. 21 shows as a data structure an ERP-OFDM PHY frame structure, which can be used with the invention.
Figure 22:
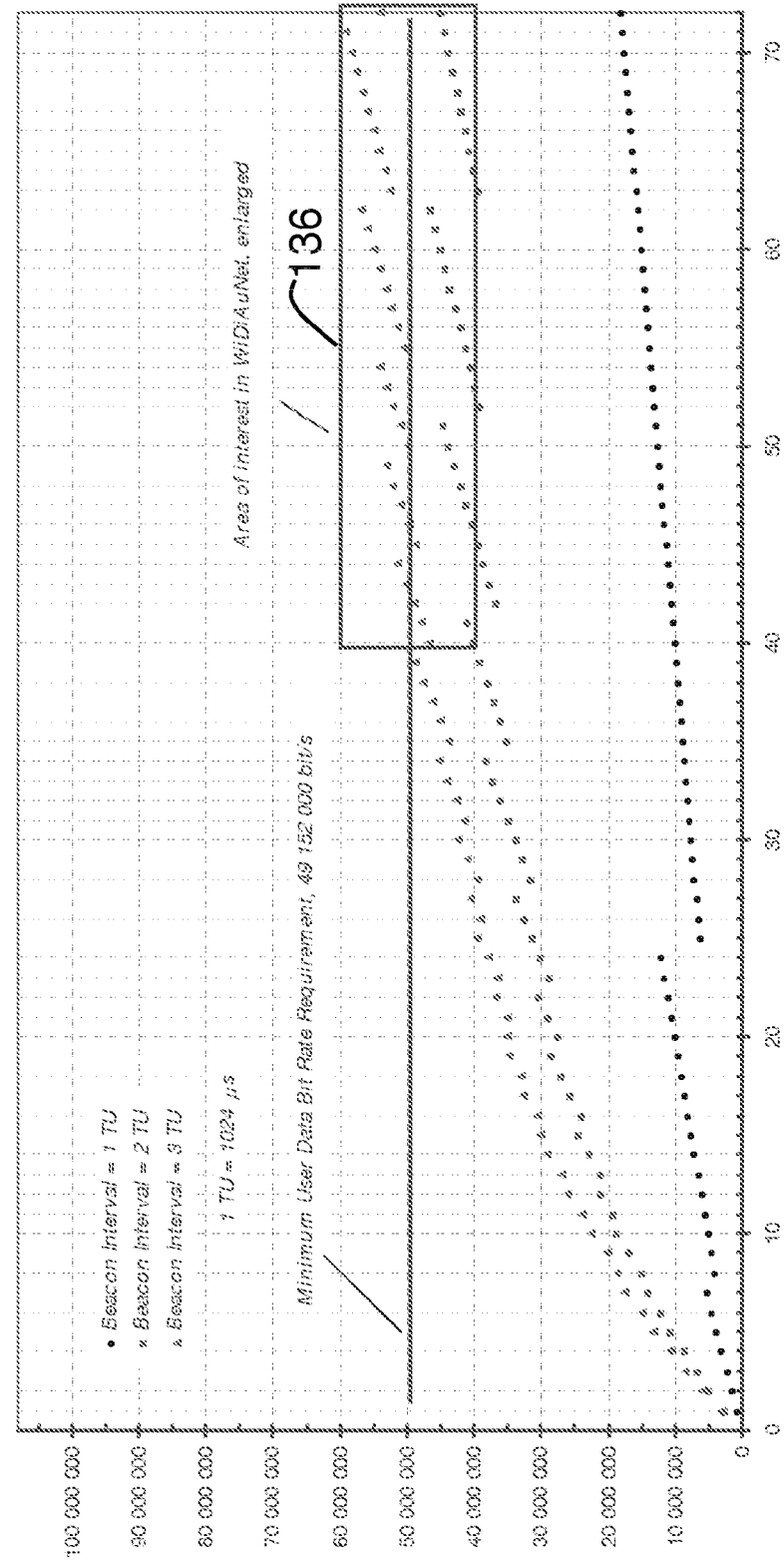
FIG. 22 shows as a graph the bandwidth requirement for the invention

According to FIG. 25, in order to guarantee the timely transport of audio data, the highest possible repetition rate of contention-free periods 138 must be realized. At the same time, the maximum fraction of the network capacity must be reserved for the audio traffic. The IEEE 802.11 standard requires that there must be enough contention traffic time within each repeating contention-free interval for the transmission of one maximum size data frame together with its acknowledgement frame plus two SIFS periods and two slot times. With the 108 Mbit/s bit rate and with the ERP-OFDM PHY framing this requirement equals to 212+40+2×10+2×9=290 µs. As described in the IEEE 802.11 standard, the contention traffic in the beginning if the contention free period 138 may foreshorten the contention period by a maximum value of the sum of an RTS control frame, a CTS control frame, one maximum size data frame, an ACK control frame plus four SIFS. With the 108 Mbit/s bit rate and with the ERP-OFDM PHY framing this requirement is equal to 40+40+212+40+4×10=372 µs. The contention-free period starts with a Beacon frame 67 (FIG. 13) followed by a SIFS. With the 108 Mbit/s bit rate and with the ERP-OFDM PHY framing this requirement equals 76+10=86 µs. The contention-free period ends with a CF-End frame 109 (FIG. 20). With the 108 Mbit/s bit rate and with the ERP-OFDM PHY framing this requirement equals to 40 µs. The remaining time within the contention-free repetition interval is available for the contention-free data traffic. As the granularity of the contention-free interval is one 1,024 µs time unit (TU), the time available for contention-free traffic when the contention free interval is set to one TU is 1024−290−372−86−40=236 µs. Taking into consideration the maximum data frame size as specified by IEEE 802.11, the MAC, WEP, and PHY encapsulation overheads and the PIFS between successive data frames, only the maximum of 72 samples of the 8-channel 24+8-bit, 192 kSample/s data can be transferred within this time. Because of the audio sampling rate, the real-time need is slightly over 196 samples during each TU. Therefore, this is not a working solution. With contention free interval set to two TUs, the time available for contention-free data becomes 1,260 µs which allows the transmission of up to five of largest size 72 sample frames in 1,155 µs plus an additional 27 sample frame in 104 µs. This totals 387 samples in two TUs while the minimum real-time requirement is slightly more than 2×196=392 samples. So this is just slightly too little capacity for real-time audio transfer. It is therefore obvious that the smallest and the most desirable contention-free repetition interval is three TUs, 3×1,024=3,072 Ps.

To optimize the smooth flow of data and to minimize the buffering needs, the average rate of samples per TU should be kept as close to 1,024/1,000×192=196.61 as possible by varying the size of the data frames in the proper way in accordance with FIG. 23. The following frame size algorithm, that is one of the key innovations in this invention, is introduced. The contention-free time is first split into 12 buffers of varying size. These are presented as columns in FIG. 23. The buffer size varies between 49 and 51 sample records each according to the following set of size adjustment rules. The first, second, fourth, fifth and sixth buffers of the adjacent buffer sets of 12 buffers each, contain 51 samples while the first buffer of the third set contains 50 sample records. All the other buffers contain 49 samples. This sequence repeats on every seventh buffer set up to the $125^{th}$ buffer set after which the complete cycle is repeated from the beginning. The only exception to the above rules is the first buffer of the $60^{th}$ buffer set that contains 50 samples instead 51 as would be stated by the inner repetition rule. This algorithm guarantees in accordance with FIG. 24 that the buffering jitter remains below +/− one sample within all the buffer sets and becomes zero at the end of each $125^{th}$ sample buffer set. With this adjustment algorithm there is a worst-case margin of 180 µs within the contention-free data transfer time. This is enough time for one additional 1,632 data octet frame or for two 450-octet user data transfers, which can be used, for desired additional real-time control purposes. This arrangement also makes it possible to support the effective user data contention traffic of up to 12 Mbit/s along with the real-time audio transmission. The contention traffic is available for system configuration and control as well as for other independent data exchange.

As shown above, the choice of at least three TUs for the duration of the Beacon Repetition interval is required to reserve enough bandwidth for the contention-free isochronous audio traffic. Selecting the minimum value of three TUs further minimizes the system delay and buffering requirements. Also, selecting the minimum value of three TUs, a maximum bandwidth for the contention-based traffic is assured, in addition to the contention-free isochronous audio traffic.

The combination of these three limiting factors is called an optimum value in this application.

Error Control

Figure 7:
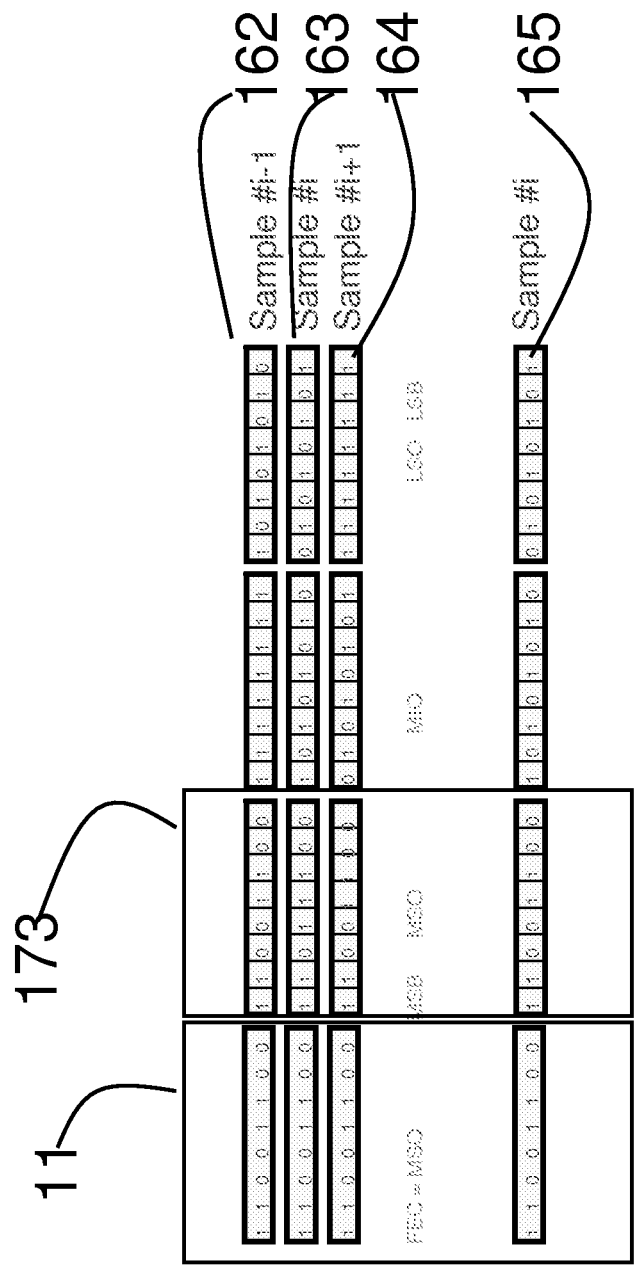
FIG. 7 shows with the help of the data structure of FIG. 6, the error correction principle in accordance with the invention.
Figure 8:
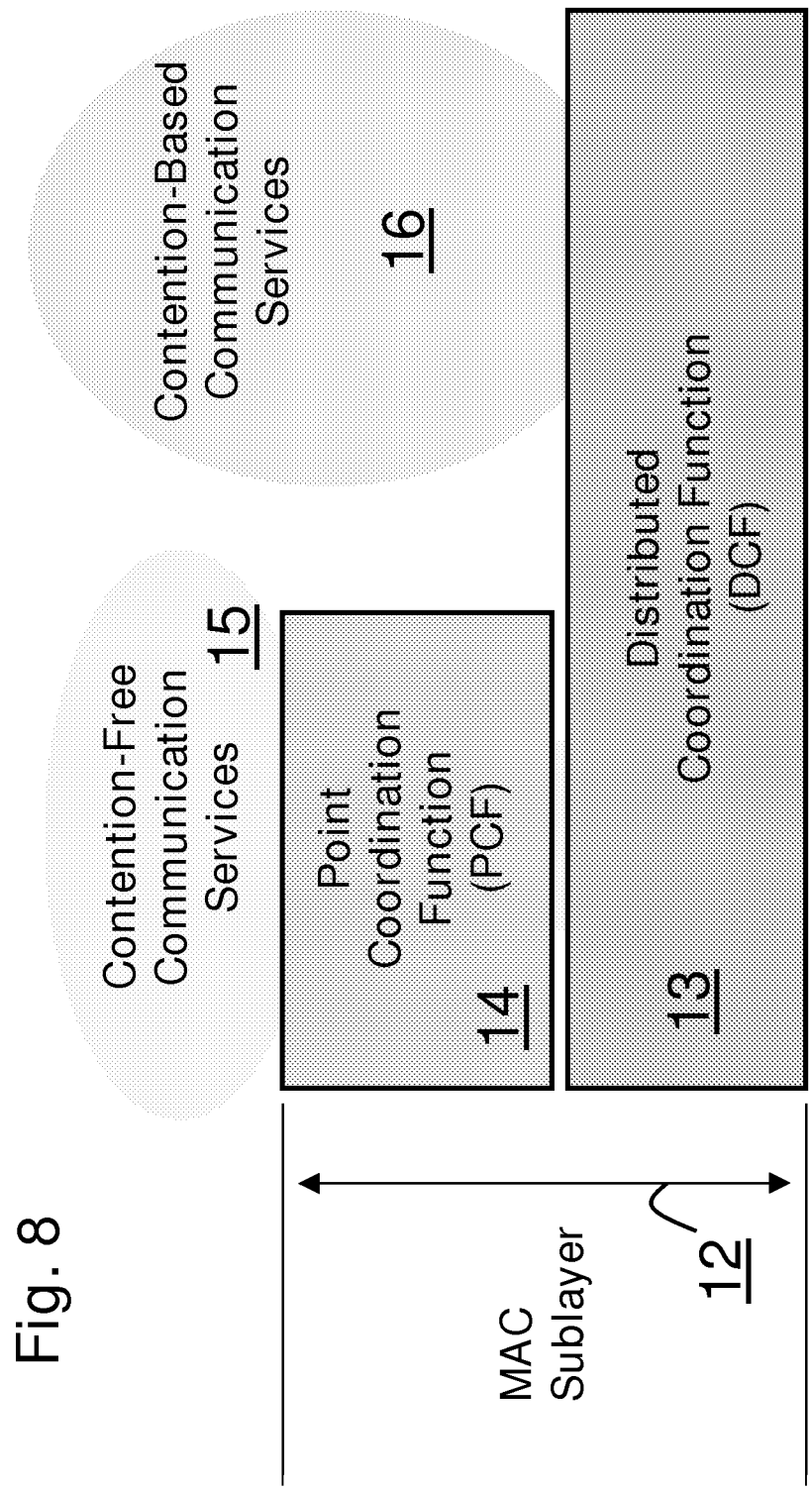
FIG. 8 shows as a block diagram the Medium Access Control (MAC) architecture, which can be used with the invention.
Figure 9:
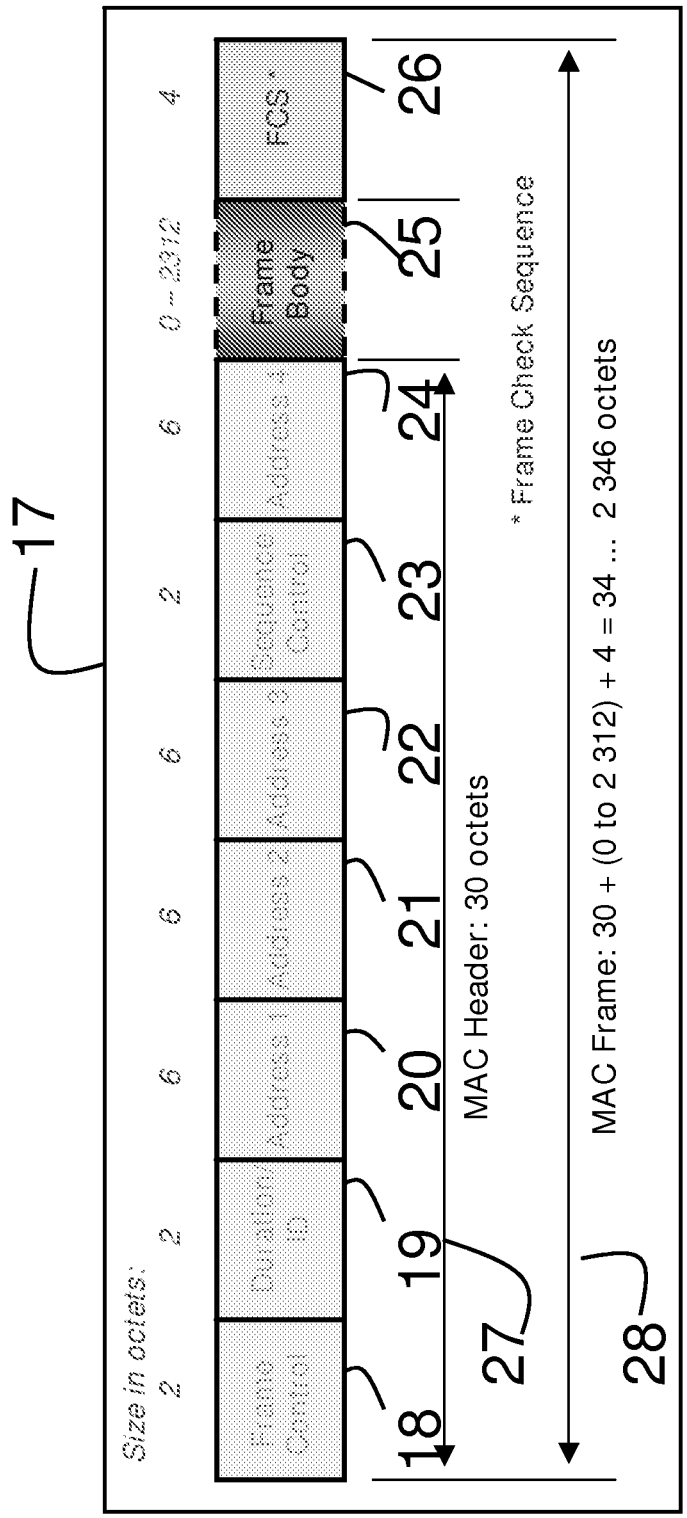
FIG. 9 shows as a data structure the general MAC frame structure, which can be used with the invention.
Figure 10:
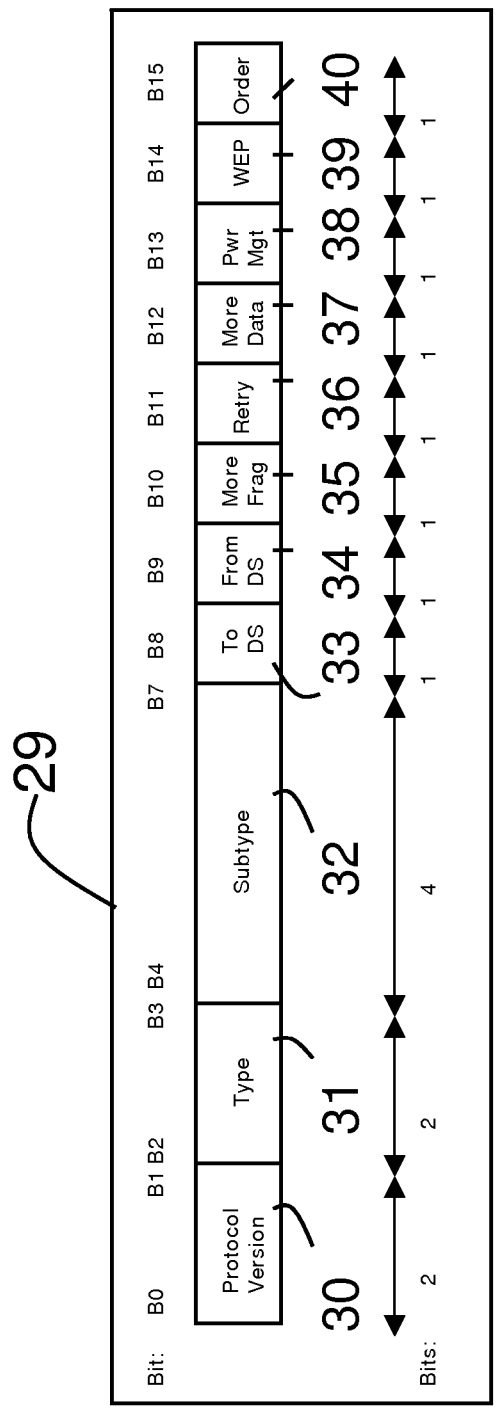
FIG. 10 shows as a data structure the WLAN frame control field, which can be used with the invention.
Figure 11:
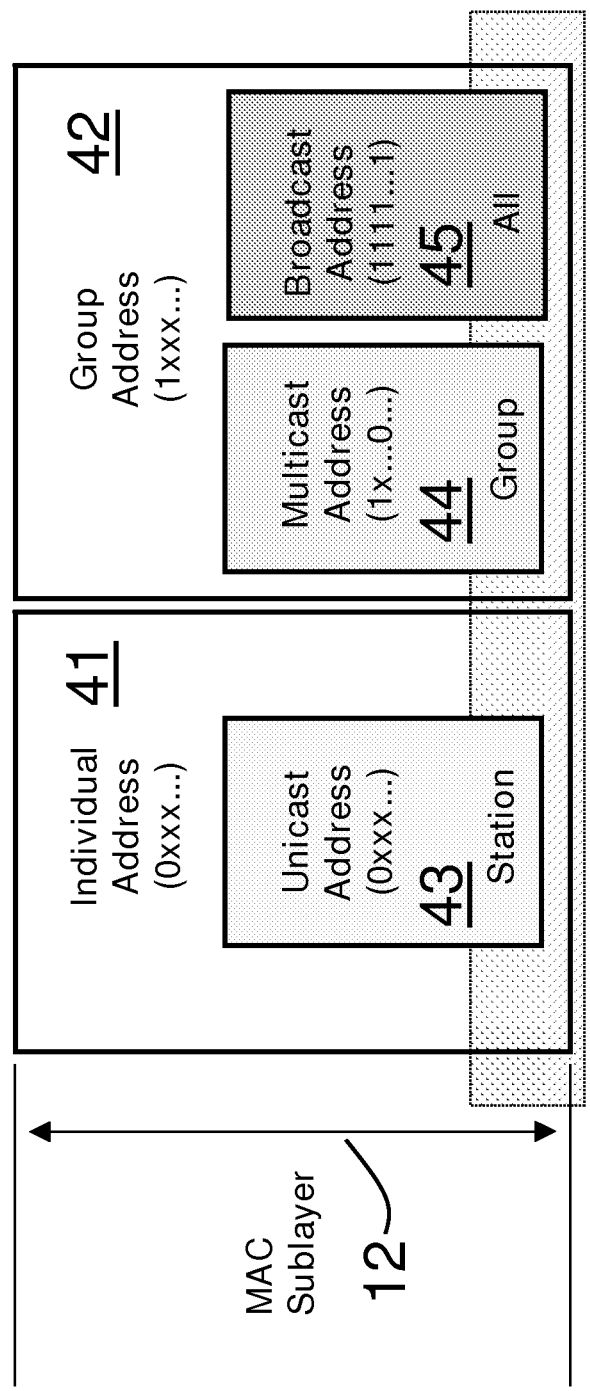
FIG. 11 shows as a block diagram the possible medium access control (MAC) addresses, the multicast version of which can be used with the invention.
Figure 12:
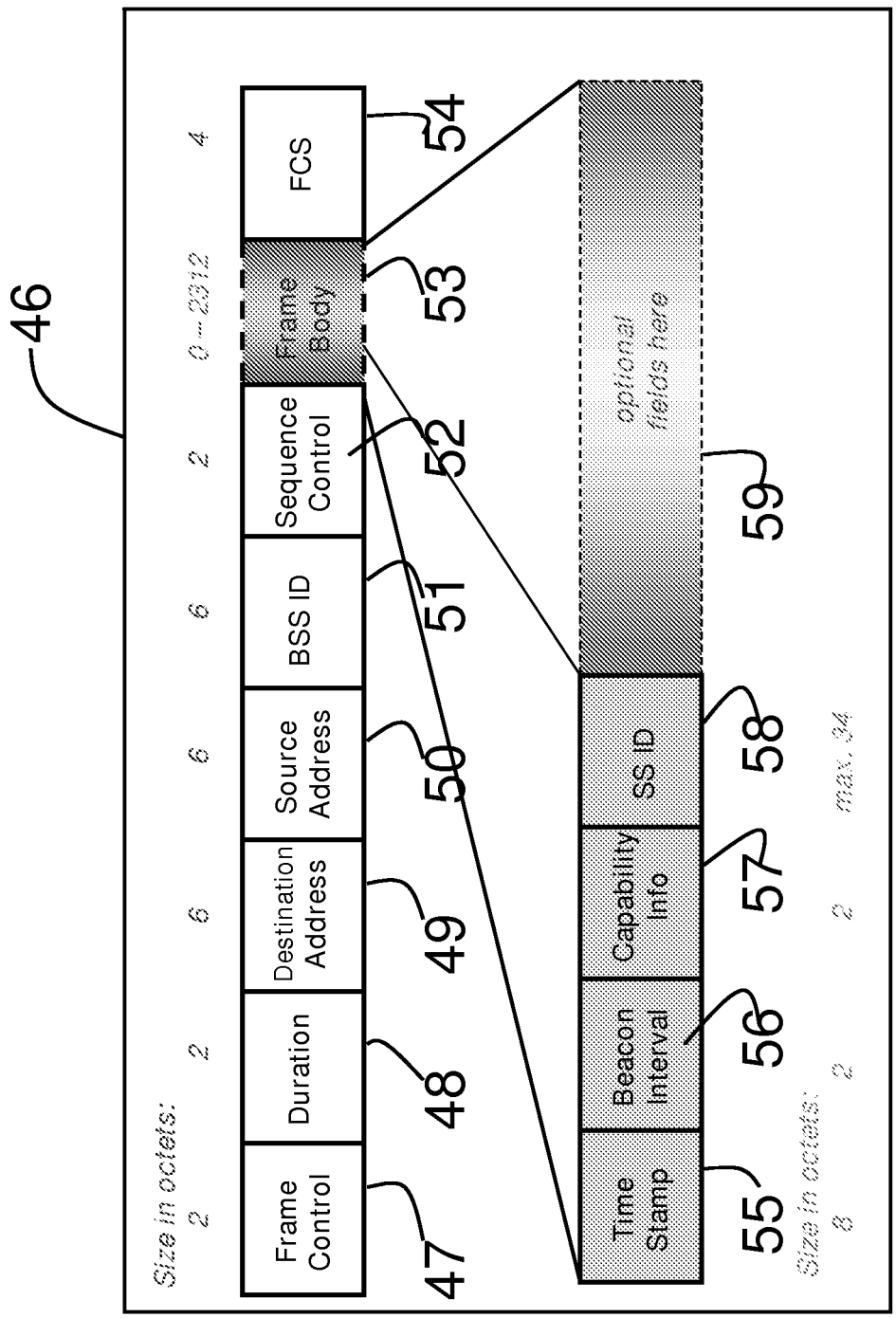
FIG. 12 shows as a data structure the generic beacon frame, which can be used with the invention.

According to FIG. 7, the error control method is optimised for simplicity and speed under the assumptions of human listening of multi-channel studio-quality voice and music audio sound. This means a simple and fast best-effort error correction scheme that either corrects the remaining application level transmission errors of the faulty frames completely or reduces their audible effect to a non-observable level. The method takes advantage on the long 24-bit audio data samples and the high 192 kSample/s sampling rate as well as the inherent property of the extended IEEE 802.11g implementation to transform transmission path originated burst errors to single-bit errors in reception. However, this error correction scheme is not appropriate for applications where no errors can be tolerated.

In accordance with FIG. 7, before the transmission phase, an eight-bit Forward Error Control (FEC) octet 11 is appended in front of the most significant octet 173 of each sample 162-165. This FEC octet 11 is formed by duplicating the most significant octet 173 of the data sample. Thanks to the WLAN transmission error correction method, almost all the residual reception errors are single-bit errors. It is therefore sufficient to correct the effects of single bit errors. This is done so that the most significant received data octet is compared to the corresponding received FEC octet 11 and if they differ the most significant sample octet 173 is replaced by the average of the most significant octet of the previous 162 and following 164 error-free samples. This effectively eliminates almost all of the remaining errors in the most significant data octet. Because the lower order bits only represent less than 4 percent of the dynamic range of the audio, their significance is negligible. With the used high sampling rate, the residual errors are not audible by the human ear.

It is worth remembering that the multicast mode transmission transfers simultaneously the audio data of all eight channels to all the receivers in the specified multicast groups. This makes it possible to implement any intelligent error correction methods that relay on the data of the adjacent audio channels, if such a method is felt attractive. Further, if special error correction hardware or very high computation power is available on the transmitter and receivers, the powerful standard 8/24 error correction methods can alternatively be utilized for more rigorous error correction.

Synchronization

According to FIG. 20, the synchronization within the system is based on the repetitive appearance of the end-of-frame interrupt generated by the CF-End frame 109 at exactly 2,782 µs after the beginning of each repeating 3,072 µs contention-free repetition interval. The end-of-frame interrupt of this control message 109 synchronizes all the receivers 6 within the inaccuracy of the interrupt latency time difference of the receivers. Because all the receivers are programmed to wait for this particular interrupt, the system level synchronization jitter caused by the interrupt latency is of the order of one instruction execution cycle (added with the very small processor-to-processor crystal oscillator phase jitter). In practice, this total jitter is of the order of 100 ns and cannot possibly be noticed by human listener. For comparison, the 192 kSample/s audio sampling cycle is 5.21 µs.

Detailed Description of the WLAN Transmission Cycle

According to FIG. 25 in the idle state, when no audio signal is present, the transmitter is programmed to run the beacon interval of one time unit (1 TU). In this way, the system response delay to the beginning of the new incoming audio stream, and consequently the size of the transmitter buffer is minimized. When the audio stream beginning is detected, the transmitter transits to the active transmission state. During the active transmission phase, the beacon interval is reprogrammed to three time units and each WLAN audio transmission slot is consequently programmed to last for three time units (TU) of 1,024 µs each totalling 3,072 µs. The point coordination function (PCF) is implemented in the transmitter of the WLAN access point station. The beacon repetition interval, and hence the contention-free repetition interval, are set to three time units and every such period contains a contention-free and a contention part. The length of the allocated contention-free period is set to 2,782 µs using the CFPMaxDuration parameter in the Beacon frame 67 and this set-up leaves a guaranteed 290 µs for the decentralized control function (DCF) contention traffic. This time is large enough for the transmission one maximum length data frame during the contention period together with its acknowledgement and the associated inter-frame elements as required by the IEEE 802.11 standard. It also means that a minimum of 6.16 Mbit/s of bandwidth (when maximum size data frames are used) is always available for contention traffic. Under heavy traffic of large frames, the allocated contention-free period becomes foreshortened from the beginning when a frame is being transmitted during the expected start of the contention-free period. Because this contention exchange can include the RTS, CTS and ACK control frames with their associated inter-frame elements in addition to a maximum size data frame, up to a maximum of 372 µs may be consumed by the busy medium from the beginning of the contention-free period.

The worst-case transmission-timing scenario for the audio data is as follows. The expected beginning of the contention period occurs but a maximum length contention transfer sequence was just started. It will cause a 372 µs contention-free period foreshortening. Only after this foreshortening delay, the 40 µs Beacon message that sets the NAV condition, can be transmitted. The first audio data block transmission starts after an additional 10 µs SIFS time has elapsed. This is a total of 459 µs after the expected beginning of the contention-free period. In the case of a smaller foreshortening, a quiet filler period is inserted by the transmitter software to reach the 459 µs tick. This arrangement guarantees that the first audio bit is always sent on the same relative tick within the 3,072 µs contention-free repetition interval. The available transfer time for the contention-free audio data is therefore 3,072−458−290−40−10=2,274 µs. In the worst-case scenario, the first audio buffer contains fifty-one 24+8-bit sample records. The following eleven audio data blocks contain 49 sample records each. When the MAC and ERP-OFDM PHY framing fields are included, the corresponding frame transfer times for the 49, 50, and 51 sample records become 156 µs, 160 µs, and 160 µs, respectively. In the largest size 12-tuple, there are 51+11×49 audio records. The twelve blocks are transmitted end-to-end with a 19 µs PIFS period in between them. Thus the worst-case total time from the first audio bit, to the last one is 160+11×156+11×19=2,085 µs. The effective time compression over the WLAN is thus 2,085/3,072=68 percent. The twelfth audio block is again followed by a 19 µs PIFS period and this is followed by a 180 µs programmed idle delay after which a 40 µs CF-End broadcast frame 109 terminates the contention-free period, also resetting the NAV condition initially set by the beginning of the Beacon frame. This happens exactly at the same time as the contention-free period would have ended based on the timers set by the CFPMaxDuration parameter of the Beacon frame. The time margin within the contention-free period of 180 µs out of the minimum available time of 2,284 µs represents just an eight percent contention-free time margin. At this point, the contention period starts allowing the transmission of a single maximum size frame with an ACK response plus the associated two inter-frame SIFS times and two slot times as specified in IEEE 802.11 standard.

Operation of the Transmitter and Base Station

Figure 26:
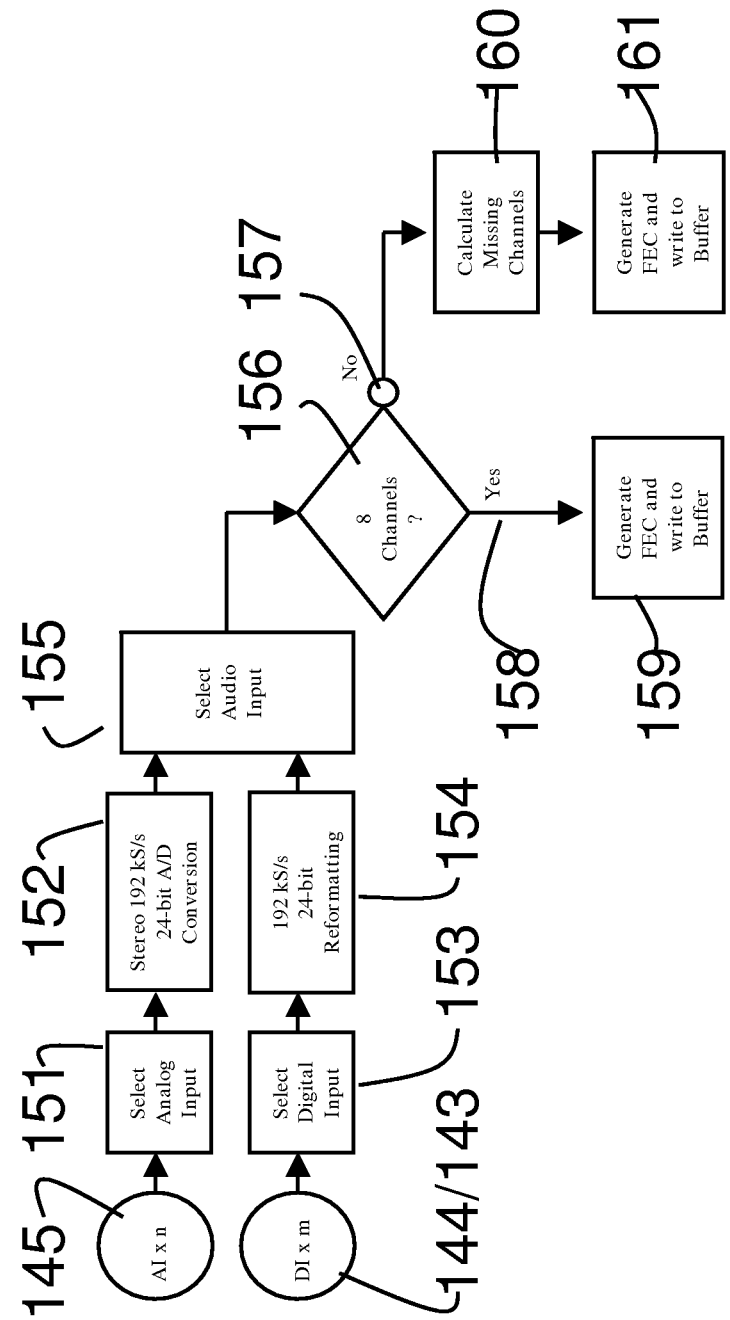
FIG. 26 shows as a flow chart audio input processing in accordance with the invention.

In accordance with FIG. 26, the system selects between n analog inputs 145, or m AES (S/PDIF) digital inputs 144/143 in phases 151 or 153. If an analog input was selected, the buffered analog stereo signal is next converted in phase 152 into a 2×24 bit form, with a 192 kS/s dual A/D converter. If a digital input was selected, the incoming digital stream is reformatted in phase 154 to the 24-bit 192 kS/s format as well. In phase 156 the number of audio channels is checked and if some channels are missing 157, the missing channels are calculated at step 160 and the FEC is generated and written with the audio data to the buffer at step 161. If the number of channels is eight at step 156, the data with FEC is directly channelled into the buffer through steps 158 and 159.

Multicasting means in this application a procedure, where all receivers receive the same data package, from which they extract the data appropriate for themselves. In other words, all eight loudspeaker receivers receive the data of all audio channels, but extract from this data for further processing only the data assigned to the channel they represent.

This invention is applicable for various isochronous data transmission systems, but as described here, it is particularly suitable for multi channel audio purposes.

Therefore also video solutions are suitable for some embodiments of the present invention.

In addition to WLAN transmission medium, this invention is also applicable for UltraWideband radio transmission technology, or HomePlug AV type transmission technology, where the mains power cable is used also for data transmission. In the latter case, the transmission system is not literally wire free, but since active loudspeakers always require external power feeding through a cable, no additional cabling is required for data transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An isochronous transmission method for streaming multi channel digital isochronous data in a standard wireless local area network transmission system where bandwidth is reserved for both contention-based traffic and contention free traffic, the digital isochronous data formed by samples being organized in audio frames and sent to receivers using multicasting, within consecutive beacon intervals, wherein:

the contention free traffic of the beacon interval is adjusted to an optimum value such that enough bandwidth is reserved for the contention-free isochronous audio traffic, the system delay and buffering requirements are minimized, a maximum bandwidth for the contention-based traffic is assured, in addition to the contention-free isochronous audio traffic, and in accordance with IEEE standard 802.11, the beacon interval is set to 3 time units.

2. The method in accordance with claim 1, wherein the number of the samples in the audio frames is varied in order to minimize the buffer size in transmitter and receivers.

3. The method in accordance with claim 2, wherein the number of samples in the audio frames is varied in a cycle of 125 consecutive beacon intervals.

4. The method in accordance with claim 3, wherein the number of samples is varied in the audio frames in a cycle of 125 consecutive beacon intervals in accordance with the table of FIG. 23, where each row represents the content of one beacon interval.

5. An error correction method in a system for streaming digital serial audio data for a real time solution in accordance with claim 1, in which method the audio data is divided into data blocks of predetermined length, wherein: the data block includes an error control block, the content of this block being a copy of the most significant bits of the corresponding audio data, the content of the error control block is compared to the received content of the corresponding content of the audio data, and if a difference between the audio data and the error control block is detected, the corresponding audio data is replaced by the average of the previous and the next correctly received audio data.

6. The method in accordance with claim 1 in a multicast system, which streams digital serial audio or video data wirelessly for a real time solution, in which method the data is organized in frames containing control frames and audio or video frames, and the organized audio or video data is sent by multicasting to multiple receivers within consecutive beacon intervals, wherein: the audio or video data is synchronized between the multiple receivers by an interrupt command included in each beacon interval.

7. An isochronous transmission method for streaming multi channel digital isochronous data in a standard wireless local area network transmission system where bandwidth is reserved for both contention-based traffic and contention free traffic, the audio data formed by samples being organized in audio frames and sent to receivers using multicasting, within consecutive beacon intervals, wherein:

the contention free traffic of the beacon interval is adjusted to an optimum value, and the length of the beacon interval is adjusted such that a required amount of audio data can be sent to the receivers with minimum system delay, in accordance with IEEE standard 802.11, the beacon interval is set to 3 time units.

8. A wireless transmission system for streaming digital serial audio data, in which system bandwidth is reserved to both contention traffic and contention free traffic, the system comprising means for:

organizing the audio data formed by samples in audio data frames and control frames, sending the frames to receivers within consecutive beacon intervals, adjusting the contention free traffic of the beacon interval to an optimum value such that enough bandwidth is reserved for the contention-free isochronous audio traffic, and the system delay and buffering requirements are minimized, assuring a maximum bandwidth for the contention-based traffic, in addition to the contention-free isochronous audio traffic, and setting, in accordance with IEEE standard 802.11, the beacon interval to 3 time units.

9. The system in accordance with claim 8, further comprising means for varying the number of the samples in the audio frames in order to minimize the buffer size in transmitter and receivers.

10. The system in accordance with claim 9, further comprising means for varying the number of samples in the audio frames in a cycle of 125 consecutive beacon intervals.

11. The system in accordance with claim 10, further comprising means for varying the number of samples in the audio frames in a cycle of 125 consecutive beacon intervals in accordance with the table of FIG. 23, where each row represents the content of one beacon interval.

12. A wireless transmission system for streaming digital serial audio data, in which system bandwidth is reserved to both contention traffic and contention free traffic, the system comprising means for:

organizing the audio data formed by samples in audio data frames and control frames, and sending the frames to receivers within consecutive beacon intervals, adjusting the contention free traffic of the beacon interval to an optimum value, adjusting the length of the beacon interval such that a required amount of audio data can be sent to the receivers with minimum system delay, and setting, in accordance with IEEE standard 802.11, the beacon interval to 3 time units.

13. An error correction method in a system, which streams digital serial audio data for a real time solution, in which method the audio data is divided into data blocks of predetermined length, wherein:

the data block includes an error control block, the content of this block being a copy of the most significant bits of the corresponding audio data, the content of the error control block is compared to the received content of the corresponding content of the audio data, if a difference between the audio data and the error control block is detected, the corresponding audio data is replaced by an average of the previous and the next correctly received audio data, and wherein the predetermined length is 32 bits.

14. The method in accordance with claim 13, wherein error control is further enhanced by comparing the audio data with other channels.

15. An error correction system, which streams digital serial audio data for a real time solution, comprising means for:

dividing the audio data into data blocks of predetermined length, including into the data block an error control block, the content of this block being a copy of the most significant bits of the corresponding audio data, comparing the content of the error control block to the received content of the corresponding content of the audio data, and replacing, if a difference between the audio data and the error control block is detected, the corresponding audio data by the average of the previous and the next correctly received audio data, wherein the predetermined length is 32 bits.

16. The system in accordance with claim 15, wherein error control is further enhanced by comparing the audio data with other channels.

17. A synchronization method in a multicast system, which streams digital serial audio or video data wirelessly for a real time solution, in which method the data is organized in frames containing control frames and audio or video frames, and the organized audio or video data is sent by multicasting to multiple receivers within consecutive beacon intervals, wherein:

the audio or video data is synchronized between the multiple receivers by an end-of-frame interrupt generated by an accurately timed CF-End control frame, included in each beacon interval, and, in accordance with IEEE standard 802.11, the beacon interval is set to 3 time units.

18. The method in accordance with claim 17, wherein the end-of-frame interrupt of the accurately sent CF-End control frame is used for frequent low-jitter resynchronization.

19. A system using multicast method, which streams digital serial audio or video data wirelessly for a real time solution, the system comprising:

means for organizing the data into beacon intervals including both audio or video data frames and control frames, means for sending the organizing frames by multicasting to multiple receivers within consecutive beacon intervals, means for synchronizing the audio or video data between the multiple receivers by an interrupt command included in each beacon interval, and means for setting, in accordance with IEEE standard 802.11, the beacon interval to 3 time units.

* * * * *